United States Patent [19]

Phillips et al.

[11] Patent Number: 5,835,199

[45] Date of Patent: Nov. 10, 1998

[54] FIBER-BASED LADAR TRANSCEIVER FOR RANGE/DOPPLER IMAGING WITH FREQUENCY COMB GENERATOR

[75] Inventors: Mark W. Phillips, Boulder; Paul J. M. Suni, Longmont, both of Colo.; J. Alex L. Thomson, Santa Fe, N. Mex.

[73] Assignee: Coherent Technologies, Lafayette, Colo.

[21] Appl. No.: 651,156

[22] Filed: May 17, 1996

[51] Int. Cl.[6] ........................................... G01C 3/08
[52] U.S. Cl. .................. 356/5.03; 356/5.09; 356/28.5
[58] Field of Search ............................... 356/5.03, 5.09, 356/28, 28.5

[56] References Cited

U.S. PATENT DOCUMENTS

| | | | |
|---|---|---|---|
| 4,960,329 | 10/1990 | Schofield | 356/5 |
| 5,298,962 | 3/1994 | Nourrcier | 356/5 |
| 5,446,530 | 8/1995 | Reeder et al. | 356/5.01 |
| 5,485,009 | 1/1996 | Meyzonnetie et al. | 356/5.09 |
| 5,534,993 | 7/1996 | Ball et al. | 356/5.09 |

OTHER PUBLICATIONS

"Pulsed Operation of an Optical Feedback Frequency Synthetiser," Hodgkinson and Coppin, *Electronics Letters*, vol. 26, No. 15, pp. 1155–1157, (Jul. 1990).

"Frequency Translation of Light Waves by Propagation Around an Optical Ring Circuit Containing a Frequency Shifter: I. Experiment," Shimizu, Horiguchi, Koyamada, *Applied Optics*, vol. 32, No. 33, 6718–6726 (Nov. 1993).

"Optical Isolators Adapt to Communicaton Needs," Donald K. Wilson, *Laser Focus World*, Apr. 1991.

"High–Power Q–switched Erbium Fiber Laser Using an All–Fiber Intensity Modulator," Alain Chandonnet and Gilles Larose, *Optical Engineering*, vol. 32 No. 9, 2031–2035 (Sep. 1993).

Brochure: "Panda Fiber Polarization Maintaining Fiber," Fujikura Ltd. Fiber, Corning, New York.

*Primary Examiner*—Mark Hellner
*Attorney, Agent, or Firm*—James R. Young; Chrisman, Bynum & Johnson, P.C.

[57] ABSTRACT

The present invention provides a laser radar (ladar) imaging system in which both the range of an object being imaged and the velocity of the object can be measured simultaneously and accurately with superior range resolution and with minimal ambiguity. Use is made of a ladar system based on matched-filter cross-correlation of light pulse waveforms that have multiple, simultaneous frequency components with phase variation and incommensurate spectral frequency spacing between frequency components.

64 Claims, 14 Drawing Sheets

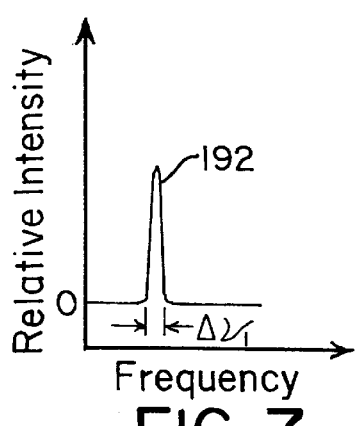
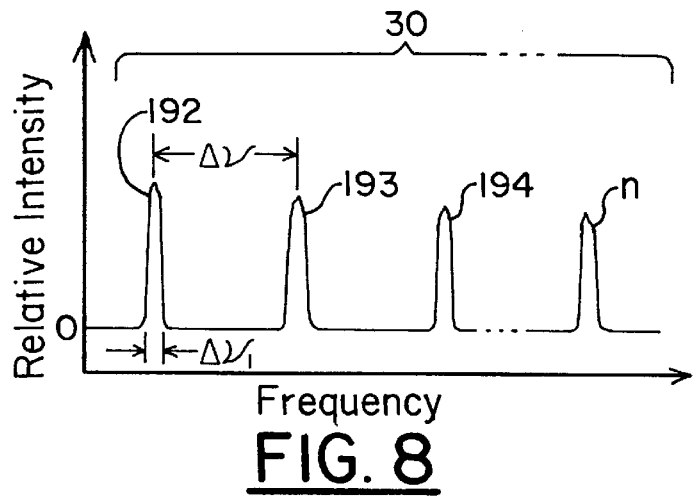
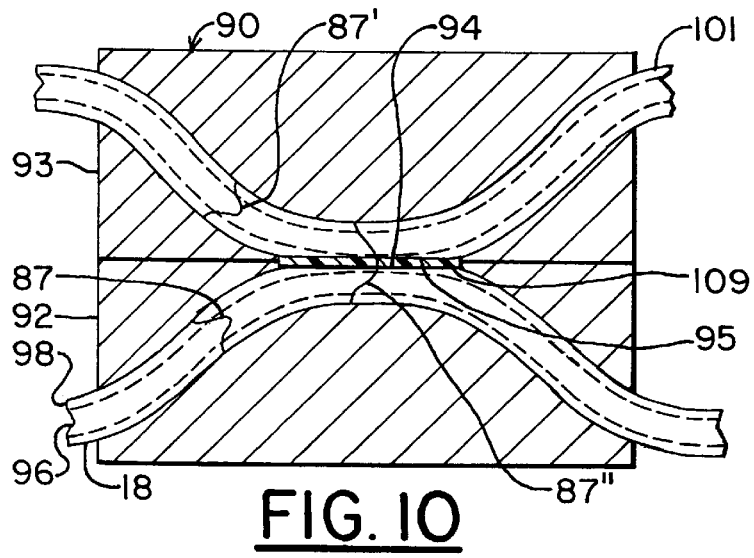
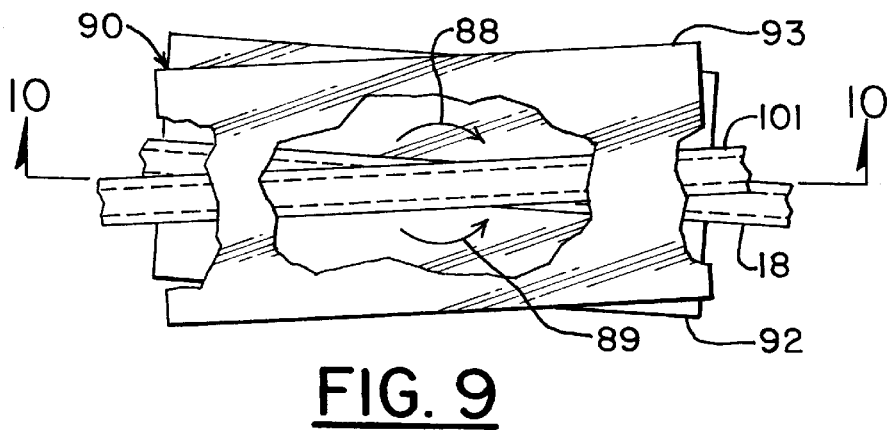

FIBER-BASED LADAR TRANSCEIVER FOR RANGE/DOPPLER IMAGING WITH FREQUENCY COMB GENERATOR

BACKGROUND OF THE INVENTION

1. Field of the Invention

This invention relates generally to methods and apparatus for laser-ranging, Doppler speed detection, and imaging and more particularly to generation and transmission of laser waveforms comprising multiple fixed frequencies with incommensurate spectral frequency spacing to a target object and detection of returned reflections of the waveforms for unambiguous range/Doppler imaging and range and velocity detection by matched filter correlation of the returned waveform with the transmitted waveforms.

2. Brief Description of the Prior Art

There are many practical applications for optical imaging systems that can be focused on a target object and which can produce accurate information about the position and motion of the target object or to obtain an accurate image of the target object for viewing, storing in computers, manipulating, or actuating a process or machine. For example, high altitude photographic or radar images of ground terrain and facilities can be used for military or civilian planning, mensuration, and other purposes. Shorter range imaging of objects can be used to identify and track specific military targets or to computerize processes, such as manufacturing processes, to initiate actions or process steps in response to some object identification resulting from comparing an image of the target object with a known image or standard.

In some applications, where the target object being imaged is moving, it is useful to be able to determine the range or distance of the object and the velocity at which it is moving, with or without shape determination. According to principles of Doppler remote sensing, electromagnetic radiation reflected off a moving object has a shift or change in frequency that is a function of the velocity of the object. Therefore, if one knows the frequency of the radiation propagated toward a moving object and can measure the frequency shift in the reflected beam, the velocity of the object can be determined. The range or distance of the object can also be determined from the time it takes for a signal to traverse the distance between the signal source and the object.

In a simple paradigm, continuous wave (cw) radar and ladar systems have good velocity (or Doppler shift) measuring capability, while pulsed systems have good range measuring and resolution capability. Resolution is the property of being able to separate or distinguish between two targets or features in close proximity to each other in terms of range, angle, or velocity (Doppler). Long range detection requires a high-energy pulse, which can be accommodated more readily with a longer duration pulse. However, range resolution and accuracy are functions of the signal bandwidth or frequency content and not of the transmitted pulse width. As the instantaneous bandwidth of the emitted waveform increases, the range resolution becomes finer and finer. Therefore, the transmitted pulse can be designed as wide as necessary to meet the energy requirements for the desired stand-off range detectability of the system, while coding of the transmitted signal with wideband modulation information (signal bandwidth) can be used for achieving range resolution and accuracy. The transmitted waveform, therefore, is characterized by its pulsewidth or duration and its bandwidth or frequency content. The product of these two factors is called the time-bandwidth product.

In the case of pulsed ladar, the pulse repetition interval, which is the time between successive pulses, should be greater than the time it takes for the emitted pulse to travel to a target and back when the target is at maximum detection range. Otherwise, it is not possible to determine target range unambiguously. The extraction of the wideband information in the echo or return signal can be achieved with matched-filter signal processing techniques, which distinguish return radar signals that have specific known bandwidth or frequency content from noise.

Coherent laser radar, called ladar or lidar, for use in military as well as civilian applications, offers many advantages over radio-frequency and microwave radar systems due to the higher frequency of the pulses that can be transmitted, which can increase range, resolution, and accuracy of the detection systems. Ladar is particularly appealing for its potential ability to interrogate simultaneously the range and velocity signatures of hard targets, which could improve recognition of remote, non-cooperative targets.

In conventional lidar techniques involving emission of a bandwidth-limited waveform, the resolution in range measurements $\delta r$ is linked directly to the resolution in the velocity measurements $\delta v$ by the relationship:

$$\delta v = \Delta t_1 \cdot c = C_1 \cdot c / \Delta v_1$$

where $\Delta t_1$ is the shortest duration structure in the emitted waveform temporal profile and $\Delta v_1$ is the bandwidth (FWHM) of the Fourier spectrum of the emitted waveform, and: where $\Delta t_2$ is the overall temporal duration (FWHM) of the emitted waveform and $\Delta v_2$ is the $$\delta r = \Delta t_1 \cdot c = C_1 \cdot c / \Delta v_1$$

$$\delta^r = \lambda \cdot \Delta v_2 = C_2 \cdot \lambda / \Delta t_2$$

corresponding spectral width. The constants $C_1$ and $C_2$ are dependent on the shape of the temporal and spectral profiles and are typically on the order of 0.5 (0.44 for a Gaussian distribution), and c is the speed of light. For a bandwidth-limited waveform, $\Delta t_1 = \Delta t_2$, $\Delta v_1 = \Delta v_2$, and $C_1 = C_2 =$ time-bandwidth product. Therefore, $$\delta r \cdot \delta v = C_1 \cdot (c / \Delta v_1) \cdot \lambda \cdot \Delta v_2 = C_1 \cdot c \cdot \lambda.$$

Thus, for 1532 nm radiation, for example, the range velocity resolution product ($\delta r - \delta v$) would be 459.6 $C_1$, which for a bandwidth-limited Gaussian waveform would be 202.2 m²sec⁻¹. However, for large time-bandwidth product waveforms, the relationships described above for bandwidth-limited waveforms, where $\Delta t_1 = \Delta t_2$, $\Delta v_1 = \Delta v_2$, and $C_1 = C_2 =$ time-bandwidth product, do not hold. Specifically, for large time-bandwidth product waveforms, $\Delta t_2 \cdot \Delta v_1$ can be many times greater than the individual products $C_1$ and $C_2$. Consequently, the range-velocity resolution product ($\delta r \cdot \delta v$) for large time-bandwidth waveforms becomes much smaller.

There are a number of known optical systems capable of generating wideband signals, such as amplitude mode-locking and intracavity phase modulation (frequency chirping). Most of these approaches, however, have inherent limitations that cause problems in coherent ladar applications, which are particularly limiting where simultaneous range/Doppler imaging is desired. For example, most of these approaches require the injection-locking of the ladar transmitter to a master/local oscillator frequency and are, therefore, sensitive to transmitter perturbations. Such systems also produce very repetitive discrete frequency components in the bandwidth spectrum of the emitted waveforms, the predictability of which facilitates matched-filter detection of the waveforms in the return ladar signals, but which also leads to more ambiguities in both time and frequency domains (false peaks in the maximum likelihood function of the matched-filter output). Such ambiguities increase the likelihood of false target indications from the return signals, which limits the accurate depth range of the ladar system in which targets can be imaged as well as limiting the spread of target velocities that can be measured accurately by such systems.

SUMMARY OF THE INVENTION

Accordingly, it is an object of the present invention to provide a laser radar (ladar) imaging system in which both range of an object being imaged and velocity of the object can be measured simultaneously and accurately with superior range resolution and with minimal ambiguity.

Another object of this invention is to provide a ladar imaging system that has superior range resolution and velocity measuring capabilities at substantial distances from targets.

A further object of this invention is to provide a long-range ladar imaging system with superior capabilities of distinguishing target objects from background objects or terrain.

A more specific object of this invention is to produce wide pulsewidth pulses of light of sufficient energy for extended range detection capabilities and with frequency content suitable for superior range resolution and velocity or Doppler resolution in ladar applications.

Another specific object of this invention is to produce a coherent ladar waveform with a large time-bandwidth product suitable for accurate simultaneous range/Doppler imaging.

A further specific object of this invention is to provide a ladar system with sufficient randomness in the spectral (frequency) and temporal content of a wide band waveform emission to minimize potential ambiguities, yet with sufficient pulse duration (pulse width) and energy to provide superior imaging capabilities at extended ranges.

Still another object of this invention is to provide a coherent laser radar system useful for accurate target recognition with a compact and low-power consumptive transmitter and sensor design that is robust, suitable for harsh environments, and operates in an eye-safe region of the spectrum.

A still further object of this invention is to provide a ladar system that produces as wide a bandwidth as possible within the limits of the detector bandwidth detection where large dynamic range (small to large signal strength without saturating or going nonlinear in response) is needed for imaging purposes.

A still further object of this invention is to provide a ladar system that produces as wide a bandwidth as possible within the limits of detector capabilities where dynamic range of at least about 30 to 40 dB dynamic range is needed.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the laser radar (ladar) system according to this invention may comprise a frequency comb generator for generating a waveform rich in frequency content. The waveform is generated from a seed frequency provided by a laser master oscillator. The continuous wave laser beam of the seed frequency is coupled into an optical ring circuit that has a feedback loop comprising an optical frequency shifting device, an amplifier, and a gate switch for gating out light comprising frequency comb waveforms with randomized phasing. A secondary stage power amplifier amplifies the light gated out of the feedback loop of the optical ring circuit to produce a beam pulse for transmission to a target. The waveform of the beam pulse is monitored during transmission and stored. The return echo or signal reflected by the target is detected and its waveform is compared to the transmitted beam pulse waveform for Doppler shift and time of flight derivation. Auto-correlation is used for maximum range and velocity detection. Further detailed features of the apparatus and methods of this invention are described below and shown in the drawings.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention. In the Drawings:

FIG. 7 is a frequency profile of the single frequency continuous wave (cw) input beam from the master oscillator as a seed frequency to the optical ring circuit;

FIG. 8 is a frequency profile representation of the initial frequencies in the frequency comb generated by the optical ring circuit;

FIG. 9 is a diagrammatic plan view of an adjustable optical coupler that can be used in this invention to couple light energy between fibers;

FIG. 10 is a cross-sectional view of the coupler apparatus of FIG. 9 taken along lines 10—10 of FIG. 9;

DETAILED DESCRIPTION OF THE PREFERRED EMBODIMENTS

Figure 1:
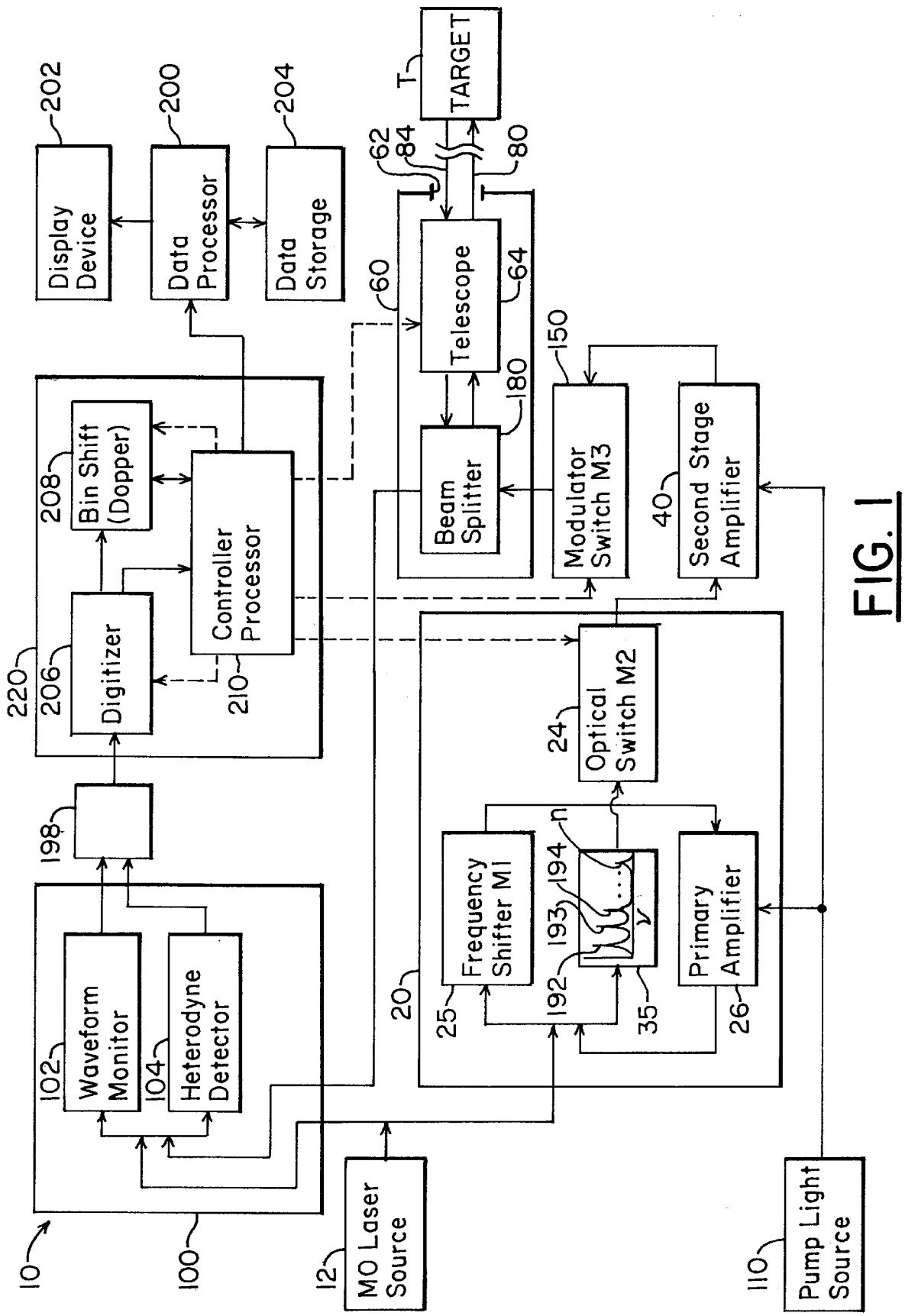
FIG. 1 is a functional block diagram of the principle components of the ladar system of this invention.
Figure 2:
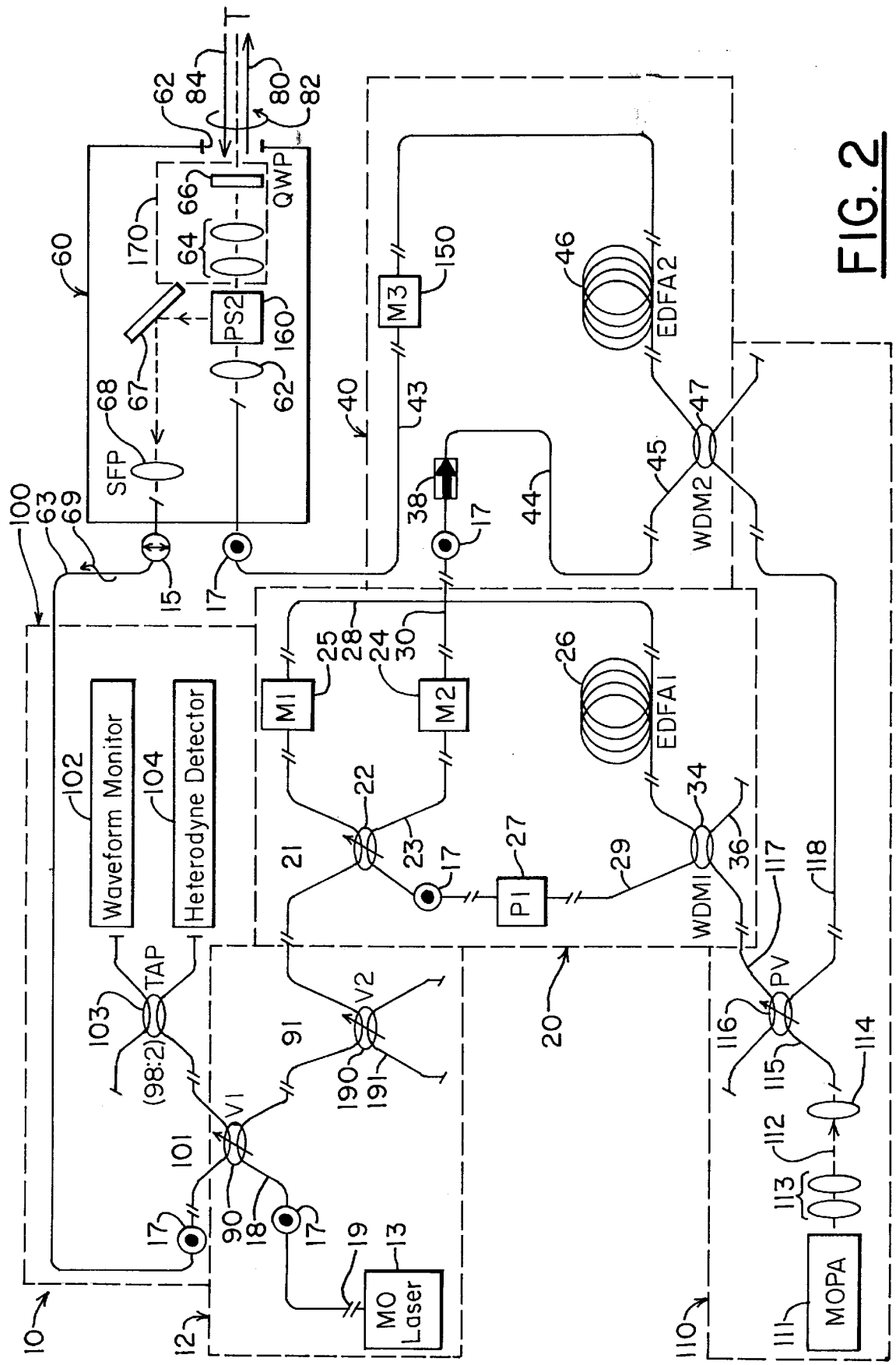
FIG. 2 is a diagrammatic view of the optical components of one embodiment of the ladar system of this invention in which single pass fiber amplification is used for second stage power amplification.

A functional block diagram of an optical fiber-based laser radar or ladar transmitter/receiver (transceiver) 10 of the present invention is shown in FIG. 1, and a schematic diagram of one embodiment of the invention is shown in FIG. 2. The primary function of the ladar system or transceiver 10 is to generate and emit pulses of laser light in a beam 80 directed toward an object or target T and then to receive reflections 84 of the emitted light back from the object or target T in a form that can be compared to the optical characteristics of the emitted beam 80 for deriving target range (distance) information or target velocity information, or both range and velocity information simultaneously. Such target range and/or velocity information can then be processed by a data processor 200 and displayed on a display device 202 or stored in a data storage device 204. For imaging the object or target T, a controller processor 210 can be used to cause the telescope and scanner apparatus 60 to scan the outgoing beam 80 over the area of the target T to obtain multiple range data points, for example, in a raster pattern is conventional and well-known in radar and ladar imaging. The multiple range data points obtained can then be stored in the data storage device 204 and processed by the data processor 200 to produce an image of the target T for display on the display device 202 according to methods that are also well-known in the art.

A pulse of light from which both range and velocity information can be derived, according to this invention, is one that has a long pulse width and a wide bandwidth. Long pulse width or pulse duration is needed to maximize velocity resolution. A large bandwidth, which also comprises many discrete frequencies, preferably with randomized phases among the frequencies, is needed for high resolution matched-filter detection in the reflected beam 84 to maximize range resolution with minimal or insignificant ambiguity effects. The more frequency content there is in the pulse of light and the more incommensurate the frequency spacings in relation to each other (i.e., unequally), the lower the likelihood of range ambiguity will be. The greater the spread in frequency content, the higher the range resolution of the ladar system will be. A beam 80 with many discrete frequency components, also referred to as a broadband frequency spectrum, in randomized phase relations among the frequency components is therefore produced and transmitted by the transceiver 10 in a long duration pulse, as will be described in more detail below.

The term light as used to describe this invention is not intended to limit the invention strictly to visible light. Instead, light is used in a more general sense to include any electromagnetic radiation in a wide spectrum ranging from infrared to ultraviolet. In fact, as will be described in more detail below, a convenient and effective light beam for purposes of this invention may be a laser beam produced by an erbium doped laser material, which produces infrared radiation of about 1532 nm wavelength. However, the invention is applicable to light at many other wavelengths as well.

Figure 4:
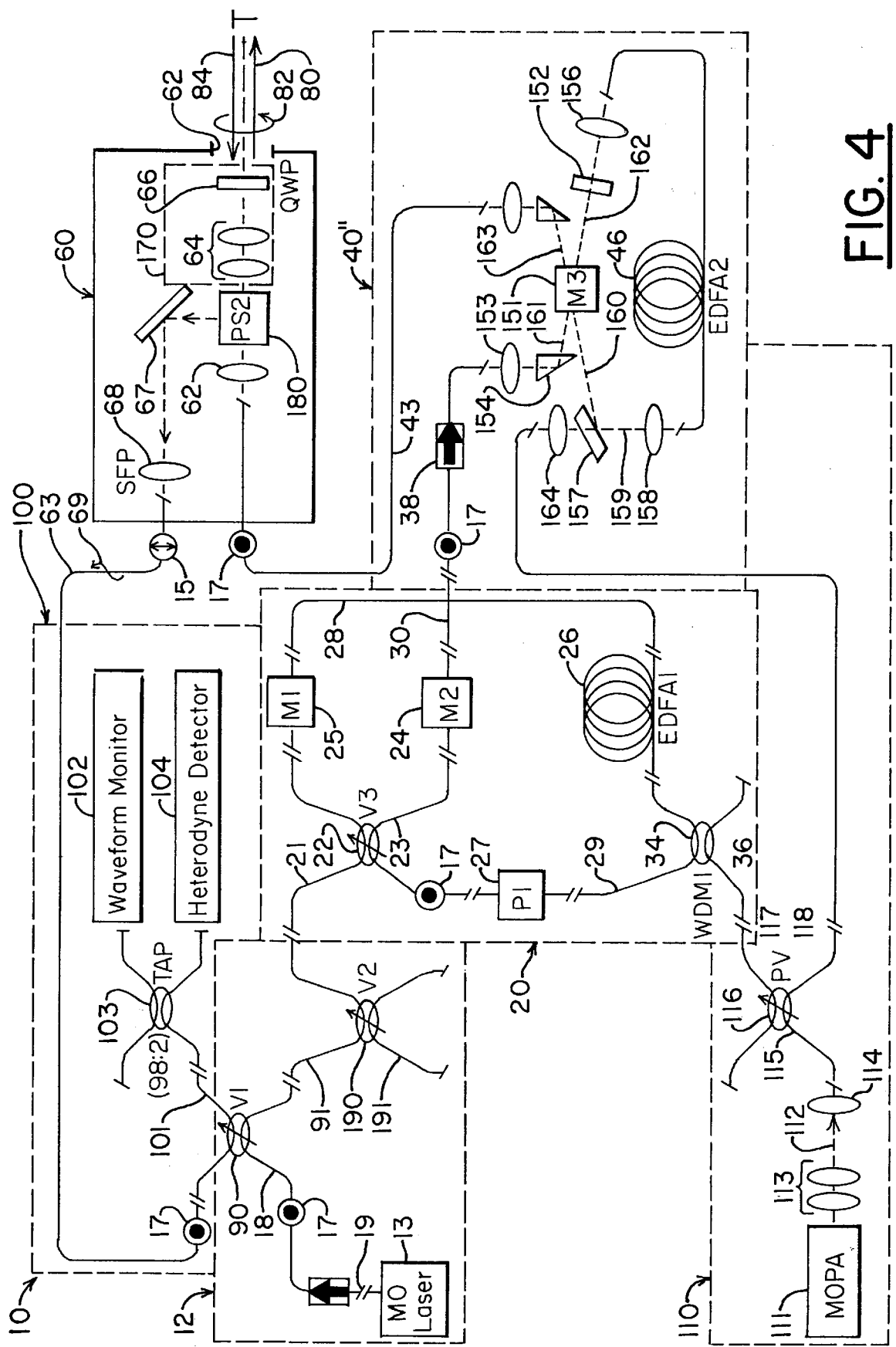
FIG. 4 is a diagrammatic view similar to FIG. 2 of still another alternate embodiment ladar system of this invention in which multiple pass (more than two) is used for second stage power amplification.
Figure 5:
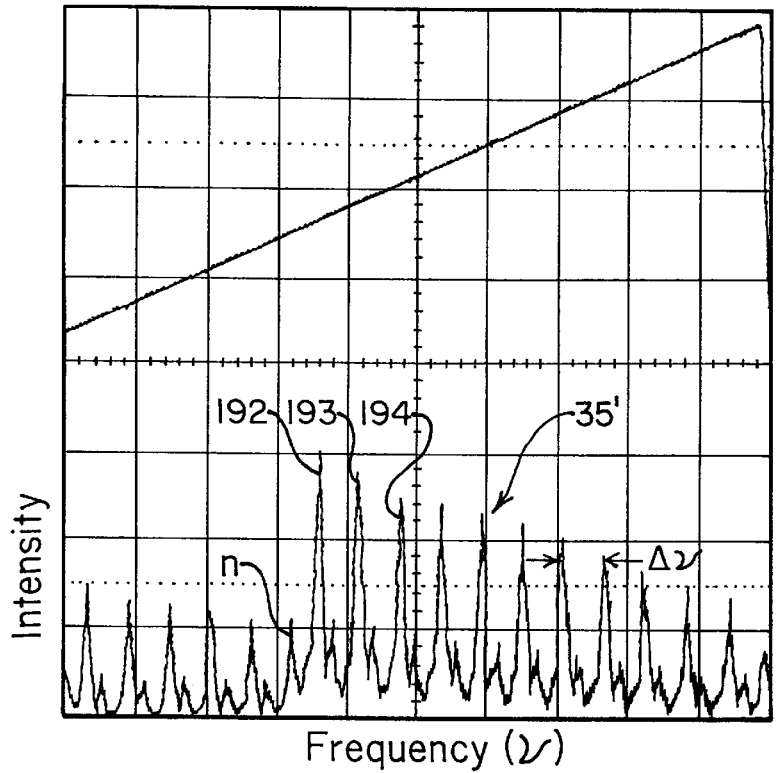
FIG. 5 is a graphical representation (spectrum analyzer display) of an exemplary frequency comb spectrum generated by the optical ring circuit in this invention.
Figure 6:
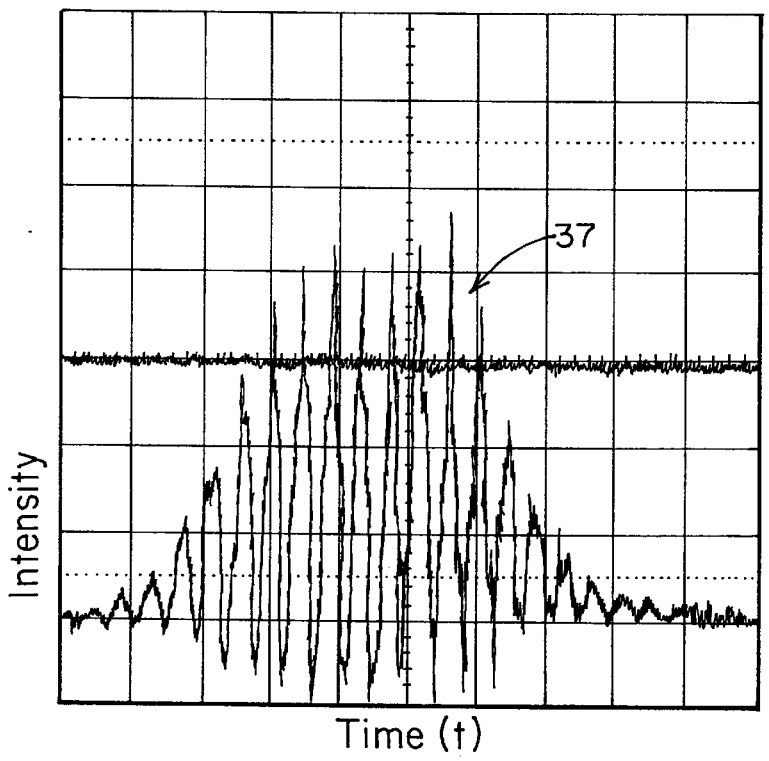
FIG. 6 is an exemplary temporal profile of the waveform produced by the optical ring circuit in this invention.

In three embodiments of this invention, wherein the signal undergoes a single pass (FIG. 2) or a double pass (FIG. 3) through the the second stage power amplifier 40 prior to transmission, the output pulse of light in output beam 80 has a frequency comb spectrum much like that illustrated in FIG. 5 and a temporal or time domain power (intensity) profile similar to that illustrated in FIG. 6. However, in another embodiment shown schematically in FIG. 4, where the signal produced undergoes multiple-pass amplification in the second stage amplifier 40", the frequency comb spectrum produced in the optical ring circuit 20 is modified to a profile more like the one illustrated in FIG. 16 and with a temporal or time domain power (intensity) profile similar to that illustrated in FIG. 15. Again, as will also be described in more detail below, the waveform of each output pulse transmitted in beam 80 is monitored for phase and frequency content as the pulse is transmitted, and the monitored waveform is stored in the signal processing circuit 220 for use in identifying by matched-filter analysis the echo or return beam signals 84 that reflect from the target T and are picked up by the transceiver 10. The time of flight of a transmitted beam pulse 80 to the target T and back is also monitored and measured in the matched-filter process and used to calculate range of the target T from the transceiver 10. Essentially, the speed of light (approximately $3 \times 10^8$ meters per second) is multiplied by the elapsed time between transmission of the pulse and reception of the echo or return signal to get total distance to and from the target T. That total distance is then multiplied by one-half to get the distance or range just to the target T. Alternatively, the transmitted beam 80 of pulses can be directed in a raster or other pattern across the area of the target T, and with the accurate range measuring capability of this invention, used to create a composite pixel image of the target T for computer storage, manipulation, or display as described above. Likewise, the pulsed output beam 80 can be scanned in a raster or other pattern over ground terrain to create a composite pixel image of the terrain for mapping or other purposes, and objects in or on the terrain can be distinguished from background because of the range measuring accuracy of this invention.

The line of sight velocity information is obtained by measuring the Doppler shift in frequency of the reflected beam 84. It is well-known, of course, under the Doppler principle that light reflected from a moving target T has a higher frequency than the original transmitted beam if the target T is moving toward the transceiver 10 and a lower frequency if the target T is moving away from the transceiver 10. The extent of frequency shift is directly proportional to the speed of the target T in relation to the transceiver 10. Therefore, by comparing a frequency of the transmitted beam 80 with the corresponding frequency in the reflected beam 84 and determining any frequency change or shift, the speed of the target T moving toward or away from the transceiver 10 can be determined. Vectorizing speed with range or distance information and angle information in several sequential reflected pulse measurements can determine velocity (speed and direction) of the target T.

Referring now primarily to FIG. 1, an optical ring circuit 20 is used to produce a wideband light signal 35 having many discrete frequency components 192, 193, 194, . . . , n from a single frequency laser beam used as a seed frequency, which is produced by a master oscillator laser source 12. The light signal 35 is then amplified for high power output pulses in the second stage amplifier 40 and transmitted to the telescope apparatus 60 for transmission in a pulsed output beam 80 to a target T. The telescope apparatus 60 also directs a sample of the output pulses to a sensor circuit 100, where the waveforms of the output pulses are detected and monitored by a photo-sensitive transducer 102, such as a photodiode or photovoltaic device, which produces electric signals that are indicative of the waveform characteristics of the output pulses. The electric signals of the monitored waveforms of the output pulses are processed and held temporarily for use as a template or reference in the signal processing circuit 220 for matched-filter processing and identification of specific echo or return pulses reflected from the target T.

The echo or return pulses reflected from the target T are collected or received by the transceiver 60 and routed to the sensor or receiver circuit 100, which senses and transduces the returned pulses to electric signals indicative of the waveforms of the returned pulses. The electric signals of the waveforms of the returned pulses are preamplified, filtered, and conditioned in a signal conditioning circuit 198, and then they are processed and matched-filter analyses are performed on them using matched-filters derived from the waveforms of the sampled output beam pulses to determine precisely the phase and Doppler frequency shifts and time of flight data for each returned pulse. A data processor 200 processes this data into useful information about the target T, such as range, velocity, mapped images, and the like, which data can be stored in a data storage device 204 for later retrieval or displayed on a display device, such as a video monitor, printer, or the like.

Returning now to the master oscillator 12 and optical ring circuit 20 for a more detailed description, continuing reference is made to FIG. 1. Essentially, coherent, narrow line width, single frequency light in continuous wave (cw) format generated in a master oscillator 12 is directed into the optical ring circuit 20, where it is used as a seed frequency to produce a continuous wave (cw) broadband light that has multiple discrete frequencies in the nature of a frequency comb spectrum such as that depicted diagrammatically at 35 in FIG. 1. A more realistic illustration of an exemplary frequency comb spectrum 35 produced by the optical ring circuit 20 is shown in FIG. 5, which is an interferometer scan of an actual signal. The discrete frequency components 192, 193, 194, . . . , n cover a frequency spread of, for example, more than 500 MHz. The frequency spread should preferably be selected carefully to match limitations in bandwidths of large dynamic range photodiode detectors, which are necessary for imaging ladar systems. The dynamic range of the detector as used in this description means the range of small to large signal strength that the detector can detect without saturating or going nonlinear in its output. Producing a wider bandwidth than can be detected within the limitations of the detector is not helpful and just wastes energy, since energy is emitted at frequencies that cannot be detected. Pulses having a temporal (time domain) profile 37, such as that illustrated in FIG. 6, with a duration of, for example, 500 nsec. is switched out of the (cw) light signal 35 by the optical switch 24 shown in FIG. 1.

To create the (cw) broadband light signal 35, the single frequency beam from the master oscillator 12 is fed simultaneously in optical ring circuit 20 to the optical switch modulator 24 and to a frequency shifting modulator 25. The portions of the beam from master oscillator 12 that are fed into the frequency shifting modulator 25 undergo an incremental shift or increase in frequency such as about 100 KHz to 50 MHz, then are amplified in the primary amplifier 26 to offset system losses, and combined again with the single frequency light from the master oscillator 12. The primary amplifier 26 is preferably a high gain erbium doped fiber amplifier (EDFAI). The combined beam comprising light of the original single frequency from the master oscillator 12 and the shifted frequency light from the frequency shifting modulator 25 are likewise fed to both the optical switch modulator 24 and to the frequency shifting modulator 25. Those portions of the combined beam fed to the frequency shifting modulator 25 have each frequency therein shifted by another incremental increase, and they are amplified again by the primary amplifier 26 before being recombined again with the single frequency light from the master oscillator 12 and directed again to both the optical switch modulator 24 and frequency shifting modulator 25. As this process is repeated over and over again, the resulting successively recombined portions of the original and sequential stages of frequency shifted light fed to the optical switch modulator 25 comprise the original seed frequency 192 produced by the master oscillator 12 plus a plurality of incrementally shifted frequencies 193, 194, . . . , n, as illustrated in the frequency spectrum 35. Therefore, when the optical switch modulator 24, responding to a control signal from control processor 210 in the electric signal processing circuit 220, is actuated to "on" for a predetermined time period before being turned "off" again, it gates or passes a pulse 37 of light, as shown for example in FIG. 7, that comprises all of the frequencies 192, 193, 194, . . . , n and phases in the frequency comb 35, which frequency comb is illustrated more completely in FIG. 5. The controller processor 210 times the control signals to the optical switch modulator 24 for gating the duration of each pulse 37 and the interval between successive pulses 37 to accommodate sequential reception of discrete reflections 84 from the target T between successive output pulses in output beam 80. The optical switch modulator 24 also serves as an optical gate to prevent amplified spontaneous emission (ASE) from the second stage amplifier 40, which is explained in more detail below, from propagating backward into the primary amplifier 26 between pulses 37. The pulsed waveform produced by the optical ring circuit 20 has a wide bandwidth that is rich in frequency content and is of sufficient duration to have a large time-bandwidth product, which combination provides the basis for the excellent range and velocity resolution capability of the ladar system 10 according to this invention. The discrete frequency spectrum of the waveform 35 could lead to some ambiguities or false maximum amplitude peaks in both the time and frequency domains in analyzing the reflections 84 from the target T, which could potentially limit the range depth of the target as well as the spread in velocities of the target that can be accommodated. However, this problem can be minimized by producing a large concentration of frequencies in the waveform spectrum 35. Also, some smearing or randomizing can be added to the waveform, which is a secondary effect of the multiple pass secondary amplification stage 40" of FIG. 4, as will be described in more detail below. Optional use of a phase modulator (not shown) with a large phase shift and a modulation period that is short in comparison with the primary loop transit time in optical ring circuit 20 may be used to randomize the phases of different frequency components. According to the well-known mathematical relationship, rate of change of phase is equal to instantaneous frequency shift, so varying or randomizing phases fills the frequency content of the waveform with incommensurate spectral frequency spacing. The additional frequency content in the waveform from such smearing or randomizing reduces the amplitude of false peaks in the matched-filter output and provides a more dominant peak for unambiguous range-velocity determination, as will also be illustrated in more detail below.

The pulsed, wideband multiple frequency beam signals 35 produced in the optical ring circuit 20 are then directed into a secondary amplification stage 40, where they are amplified to higher power before sending them to the telescope apparatus 60. The second stage amplifier 40 can be any of a number of configurations or variations, three of which are illustrated schematically in FIGS. 2, 3, and 4, respectively. Each of these configurations or variations preferably uses a fiber amplifier, such as an erbium-doped fiber amplifier (EDFA) 46. In the FIG. 2 embodiment of the secondary stage or power amplifier 40, the wideband pulse 35 produced by the optical ring circuit 20 undergoes one pass through the EDFA 46 to extract additional energy from the amplifier 46 before proceeding to the transceiver apparatus 60 for transmission. In the secondary stage power amplifier embodiment 40" illustrated in FIG. 4, the wideband pulse 35 from the optical ring circuit 20 undergoes multiple passes through the EDFA 46 and is then gated out to the transceiver apparatus 60 by an acoustic modulator 151. Each of these embodiments has advantages and disadvantages, some of which will be explained below. A pump light source 110 provides pump light for input amplification energy in both the primary amplifier 26 and the second stage amplifier 46, although separate pump light (not shown) for the respective primary amplifier 26 and second stage amplifier 46 could also be used for purposes of this invention.

The multiple frequency pulsed beam from the secondary amplification stage 40 is directed to the transceiver apparatus 60, where it is transmitted as an outgoing beam 80 to a target T. The modulator switch 150 in the single pass and double pass embodiments of FIGS. 2 and 3 acts as a temporal gate for the amplified pulses from the second stage amplifier 40 to block amplified spontaneous emission (ASE) produced in the second stage amplifier 40" between pulse amplification and transmitted in the beam 80 from returning in weak reflections from optical surfaces in the telescope 64 and feeding back into both the power amplifier 46 where it would cause oscillation and hence usurp energy, and also into the sensor or receiver circuit 100, where it would create unwanted noise during return signal detection. Essentially, the modulator switch 150 is synchronized with the actuation and deactuation of the optical switch modulator 24 by the controller processor 210 to turn "off" or close immediately after sending or transmitting each pulse of outgoing light beam 80, thereby preventing feedback into the second stage amplifier 46, into the optical ring circuit 20, or into the sensor or receiver circuit 100. In the multiple pass embodiment of FIG. 4, the modulator 151 functions as the coupler for the light beams both entering and leaving the EDFA 46. When deactivated, the modulator 151 in FIG. 4 prevents multiple pass ASE and hence parasitic lasing in the amplifier loop prior to signal injection. The single pass gain in the EDFA2 46 is purposely reduced to suppress single pass ASE. Therefore, double or multiple pass amplification may be needed for efficient extraction of stored energy in the EDFA2 46, such as shown in the double pass amplifier embodiment 40' of FIG. 3 or multiple pass amplifier embodiment of FIG. 4. The narrow band filter 152 in the FIG. 4 multiple pass embodiment passes the signal bandwidth, but it filters out the wider band ASE. In other words, the narrow band filter 152 discriminates in favor of energy extraction by the signal and against energy extraction by the ASE. The modulator switch 150 in the single and double pass embodiments of FIGS. 2 and 3 and the modulator switch 151 in the multiple pass embodiment of FIG. 4 can also be tuned to compensate for frequency shift in the optical switch modulator 24 or to compensate for velocity of the transceiver 10 with respect to the earth or other frame of reference.

The polarization beam splitter 180 passes the amplified output pulses from the second stage amplifier 40 to the telescope lenses 64 for transmission as output beam 80, and it directs the reflected beam 84 received by telescope 170 to the sensor circuit 100, where range and speed measurements are detected in the reflected beam 84. A portion of the transmitted waveform is captured in the transceiver 60 and monitored by the sensor circuit 100. Essentially, there is some amount of scattering of the output beam from second stage amplifier 40 as it passes through the optical components of the transceiver 60, including the beam splitter 180 as well as the lens assembly 64 and quarter wave plate 66 of the telescope apparatus 170. Some of this scattering from the output beam during transmission, which contains the waveform characteristics (frequency and temporal profiles) of the output beam, is captured and directed by the beam splitter 180 to the sensor circuit 100. The sensor circuit 100 detects the waveform characteristics of the output beam 80 being transmitted from this captured scatter from the optical components and stores that information for matched-filter analysis of the return echo beam 84 from the target T, as will be described in more detail below. Then, when the return echo 84 reflected from the target T is received by the telescope apparatus 170, the beam splitter 180 directs it also to the sensor circuit 100 for the matched-filter analysis.

If the outgoing beam 80 is to be scanned, such as in a raster pattern, to produce an image of the target T, appropriate steering mirrors or other steering optical components (not shown) could be provided at the outlet/inlet aperture 62 of the telescope 60, as would be within the knowledge and capabilities of persons skilled in this art. Since such beam steering components are not a part of this invention, no further illustration or description is provided.

In the sensor circuit 100, the portion of the output pulses from second stage amplifier 40 that is scattered by the optical components 64, 66 of the telescope apparatus 170 and beam splitter 180, which also comprises the waveform characteristics of the output beam 80 produced by the optical loop 20 and second stage amplifier 40, is mixed in the waveform monitor 102 with a local, single frequency oscillation beam provided by the master oscillator 12, to produce a combined or mixed beam that has beat frequencies equal to the difference between the local oscillator frequency and the waveformed signal frequencies. The resulting mixed or heterodyned beat information in the form of electric signals from the waveform monitor (first heterodyne detector) 102, which is a lower frequency (usually in the FM frequency range of about 5 to 500 MHz), is indicative of the frequencies profile in the output beam 80 but easier to detect and process electronically. These electric signals from the first heterodyne waveform monitor or detector 102 are digitized by the digitizer circuit 206 in the processor circuit 220 shown in FIG. 1 and stored temporarily for matched-filter or auto-correlation with similar information that will be derived from the reflected beam 84, when it is received and detected.

When the reflected beam 84 is received by the telescope 170 and directed by beam splitter 180 to the sensor circuit 100, the waveform or spectral profile in the reflected beam 84 is preferably, but not necessarily, detected by the second heterodyne detector 104. The two heterodyne detectors 102, 104, instead of a single heterodyne detector, are provided in the preferred embodiment of this invention, because the return or echo signal 84 reflected from the target T has much less energy or power than the much stronger monitor signal of the transmitted beam that is collected from light scattered by the optical components 64, 66 of the telescope apparatus 170 and beam splitter apparatus 180 as the output beam 80 is transmitted. Consequently, a heterodyne detector 104 that is sensitive enough to detect the weak return signal of the return or echo beam 84 would be saturated and swamped by the monitored transmitted signal 80, thus useless for waveform monitoring of the transmitted signal. To alleviate this problem, a first heterodyne detector 102 is a waveform monitor for the stronger transmitted signal, while a second heterodyne detector 104 is provided to detect and transduce the return signal 84 from the target T. However, to prevent the first heterodyne detector 102 from being saturated by the monitored transmitted signal 80, a fiber coupler or tap 103 is provided to direct only a very small portion, such as one or two percent (1–2%), of the monitored light from the transmitted beam 80 and local oscillator signal from the master oscillator 16 into the first heterodyne detector or waveform monitor 102. The second heterodyne detector 104 may be saturated or swamped by the monitored transmit signal, but its resulting electrical output is switched out or off during transmission, so it does not matter that it is saturated and that its output electric signal is meaningless at that time. As the return beam or signal 84 is being detected and heterodyned by heterodyne detector 104 to produce an electric signal indicative of the spectral profile of the return signal 84, the electric signal is digitized by the digitizer circuit 206 and matched-filter processed in signal processor circuit 220 with a series of matched-filters derived from the spectral profile of the outgoing beam 80 that was monitored and detected previously by the first heterodyne detector or waveform monitor 102, as was described above. Any shift in the frequencies of the spectral profile detected in the reflected beam 84 as compared to the spectral profile of the outgoing beam 80 is indicative of the Doppler frequency shift in the signal caused by movement of the target T toward or away from the transceiver 10. The extent of such Doppler shift, of course, is indicative of the speed of such movement of the target T in relation to the transceiver 10. At the same time, the spectral profile of the reflected beam 84, although Doppler frequency shifted by the moving target T, still retains the same overall relative spectral profile or "fingerprint" of the original spectral profile of the outgoing beam 80. Therefore, the controller processor 210 is programmed to perform an iterative sequence of matched-filter auto-correlations calculation based on a series of trial mathematical adjustments to the frequencies and phases of the spectral profile of the monitored waveform from the output beam 80 until the best match between the mathematically adjusted spectral profile of the output beam 80 and the spectral profile of the actual detected return signal 84 is found. Essentially, the trial mathematical adjustments made to the stored output waveform characteristics insert trial Doppler shifts into the stored waveform of the output beam pulse corresponding to trial velocities of the target T. These trial waveforms with Doppler shift adjustments, are then compared to the actual return signal waveform by matched-filter analysis to find a match. The controller processor 210 also monitors time elapsed from the transmission of the output beam pulse 80 as the return echo is received. Therefore, when such a match between the spectral profile of the return signal 84 and a mathematically adjusted spectral profile of the monitored output beam 80 is found, the controller processor 210 then has, from the time the matched return signal 84 is received, the precise elapsed time between transmission and reception of the pulse as well as the velocity of the target T from the mathematically Doppler shifted waveform model that achieved the match. This elapsed time multiplied by the speed of light, which is essentially constant, yields the total distance to the target T and back to the transceiver 10. This total distance multiplied by one-half provides the range or distance between the transceiver 10 and the target T. This velocity and range data can be processed in a data processor 200 for storage and/or display in a data storage device 204 and a display device 202, respectively.

Referring more specifically now to FIG. 2 along with continuing general reference to FIG. 1, an initial single frequency, continuous wave (cw) laser beam is provided by the laser generator circuit 12 as a seed frequency from which the wideband pulse ladar beam is constructed. A suitable laser source 13 for the laser generator circuit 12 may be, for example, a bulk master oscillator (MO) erbium laser having a linearly polarized output with a wavelength of 1532 nm with a very narrow frequency linewidth ($\Delta v_1$) of about 100 kHz. The master oscillator 13 can be, for example, a 1532 nm APEX Microlaser (50 mWcw), manufactured by Amoco Laser Company of Naperville, Ill. Alternatively, a single frequency fiber laser or a laser diode may be used to produce the seed frequency.

The seed frequency light beam produced by the master oscillator 16 is linearly polarized, as indicated at symbol 17, and has a single frequency with a linewidth $\Delta v_1 \sim 100$ kHz, as described above, and as illustrated in FIG. 7. The beam is preferably routed throughout the transceiver 10 with single-mode, polarization-maintaining (PM) optical fibers to provide a simple and efficient method of routing the emitted and return ladar waveforms using polarization splitters, and they guarantee a single spatial mode profile emitted from the telescope 60, which is beneficial for ladar imaging. However, the use of polarization-maintaining fibers is not essential for general operation of the system according to this invention. Fibers that do not maintain polarization and even free space light propagation with optical components that provide comparable functions to those described herein are feasible, albeit not preferred, alternatives to polarization maintaining optical fiber components.

The master oscillator 13 is, therefore, pigtailed to the polarization-maintaining optical fiber 18, which routes the seed frequency light beam to a variable coupler (V1) 90, which splits the seed light beam power from the master oscillator 13 and routes one portion via optical fiber 91 to the optical ring circuit 20 while the other portion of the seed light beam power is routed via optical fiber 101 to the sensor circuit 100. The smaller portion routed to sensor circuit 100 is used as the local oscillating signal reference for mixing with the scattered sample of the output beam 80 in the waveform monitor 102 and with the return echo signal 84 in the heterodyne detector 104, as was mentioned above and as will be described in more detail below. The optical fibers and components throughout the system are preferably coupled with angled physical contact connectors, such as that depicted at 19, to minimize back reflection or feedback problems.

The variable coupler 90 can be replaced with a fixed ratio coupler, if the energy and other design parameters are known and set. The variable coupler 90 allows some adjustment and fine-tuning. Such a variable coupler 90 can be, for example, an adjustable polished fiber coupler, similar to the embodiment depicted diagrammatically in FIGS. 9 and 10. Essentially, the optical fibers 18 and 101 are routed through respective blocks 92, 93 of coupler 90 and are polished flat at respective locations 94, 95. These respective polished flat portions 94, 95 are clamped by the respective blocks 92, 93 in contact with each other, preferably with a layer of refractive index matching liquid or paste 109, as shown in FIG. 10, at the interface of flat portions 94, 95 to eliminate air and minimize refraction and reflection of light at the interface. Consequently, some of the light propagated through optical fiber 18 couples through the interface of the flat portions 94, 95 and into optical fiber 101. More specifically optical fibers 18, 101 are composite light conductors that have respective cores 96, 97 of one density material surrounded by a cladding 98, 99 of lower density material. The lower density cladding 98, 99 with its consequent lower index of refraction focuses the light wavefront toward the core 96 to an extent that counteracts the defocussing effects of diffraction to result in a confined mode of light propagation in a light distribution profile or mode 87 similar to that shown in optical fiber 18 in FIG. 10. A comparable light distribution profile or mode 87' in the fiber 101 is shown propagated adjacent the polished flattened portions 94, 95. With the cores of the two fibers 18, 101 in close proximity, their individual modes 87, 87' are replaced by a supermode 87" that provides evanescent cross-coupling between the fibers 18, 101. The proportion of light that gets coupled from one fiber 18 into the other fiber 101 is a complex function of interaction length of the respective polished flat portions 94, 95 core spacing, and individual fiber propagation parameters. Rotating one block 92 and fiber 18 with respect to the other block 93 and fiber 101, as indicated by arrows 88, 89 in FIG. 9, can shorten or lengthen the interaction length between polished flat portions 94, 95, and thereby adjust the amount of light in fiber 18 that couples into fiber 101. Adjustable fiber couplers have some advantages, as mentioned above, in laboratory or prototype designs for finding optimum adjustments and light coupling, but they may not be necessary in commercial designs where the optimum proportions of light propagation have been determined and can be set permanently. Such adjustable or fixed proportion polished fiber couplers for use as the coupler 90 can be acquired commercially, for example, from Canadian Instrumentation and Research, Inc., of Burlington, Canada.

Referring again to FIG. 2, the major portion of the pulsed beam power that is routed via optical fiber 91 to the optical ring circuit 20 can be routed first through a second variable coupler (V2) 190, which is similar to the variable coupler 90 described above, for further regulating the pulsed light beam power that is introduced to the optical ring circuit 20. Specifically, some of the pulsed light power reaching the variable coupler 190 via optical fiber 91 can be bled off to pigtailed optical fiber 191. Since the ends of the optical fiber 191 are not connected to anything, any light power bled from optical fiber 91 into optical fiber 191 in the variable coupler 190 will be emitted into free space and out of the system. In this manner, the amount of light power left in optical fiber 91 for delivery to the optical ring circuit 20 can be regulated very precisely. Again, in a commercial unit where optimum parameters have already been determined, this coupler 190 can be fixed or even eliminated.

As mentioned above, the optical ring circuit 20 converts the single frequency seed light produced by the master oscillator circuit 13, as illustrated in FIG. 7, to a multiple frequency waveform 35', as illustrated in FIG. 5. Referring, therefore, to FIGS. 2, 7, and 8 in combination, the light that is introduced into the optical ring circuit 20 via optical fiber 21 has a single seed frequency 192, as illustrated in FIG. 7. The single seed frequency light is first routed through a third coupler (V3) 22, which may be, but is not necessarily, variable, where a portion, such as about fifty percent (50%), of the light power is diverted into optical fiber 23 and routed to the optical switch (M2) 24. When the optical switch 24 is turned off, as it is at this point, the light incident thereon is diverted out of the system and lost. However, when the optical switch 24 is turned on, it gates out a pulse of light incident thereon to the second stage amplifier 40. Before gating light pulses to the second stage amplifier 40, however, the desired additional frequency content is added to the seed light in the primary optical loop provided by the optical ring circuit 20. To do so, the remainder of the light power from coupler 22 that is not routed to the optical switch 24 remains in optical fiber 21 and is routed into the ring comprising a frequency shifting modulator (M1) 25, a primary amplifier 26, preferably a high gain erbium doped fiber amplifier (EDFA1), and a polarizer (P1) 27 that maintains a pure single polarization state for the light emitted into fiber 23.

Consequently, the portion of the original seed light that is routed to the frequency shifting modulator 25 initially has the original single frequency 192, but that original frequency 192 gets shifted to a new discrete higher frequency by the frequency shifting modulator 25. The amount of the frequency shift ($\Delta v$) of about 20 MHz is satisfactory for purposes of this invention, although even smaller frequency shifts may be desireable. Therefore, the light that reaches the primary amplifier 26 via loop fiber 28 has a discrete frequency that is higher, for example about 20 MHz higher, than the frequency of the original seed light from the master oscillator, but with the same linewidth $\Delta v_1$, for example about 100 kHz, as the original seed light frequency component 192. This new light component with the higher discrete frequency 193 can be regarded as the first frequency-shifted component of the frequency comb waveform 35.

The primary amplifier 26 circumvents power loss in the optical ring circuit 20 and makes up for the portions of the light power or energy that are gated out of the optical ring circuit 20 via output fiber 30 to the secondary amplification stage 40, as will become more clear as this description proceeds. It also makes up for optical power losses in the fibers and components of the optical ring circuit 20. Therefore, the portion of light that is amplified by primary amplifier 26 on the first pass is the first frequency-shifted component of higher discrete frequency 193 that is produced by the frequency shifting modulator 25, as was described above. The polarizer 27 is provided in the optical ring circuit 20 to clean up the polarization state of the amplified light, which tends to become somewhat degraded, primarily by the passes through the optical connectors 90, 190, 22, and 34, and to a much smaller extent by the frequency shifting modulator 25 and primary amplifier 26. The resulting polarization at this point is still desired to be the same linear polarization 17 as that produced in the master oscillator 13.

When the amplified first frequency-shifted component of higher discrete frequency 193 reaches the coupler 22, it is added to the seed light coming from the master oscillator 13 that has the original frequency component 192. The resulting mixed light has both frequency components 192, 193. A portion of that combined light power with the original frequency 192 and the higher discrete frequency 193 is diverted into fiber 21, which delivers that diverted portion to the frequency shifting modulator 25, while the remainder of that combined light power of the original frequency 192 and first frequency-shifted component of higher discrete frequency 193 is routed to the optical switch 24. The light diverted to the modulator switch 24 at this point is still being diverted out of the system by the optical switch 24 and not to the second stage amplifier 40, so it is lost energy. Meanwhile, the portion of the combined light comprising the original frequency 192 from the master oscillator 13 and the first frequency-shifted component 193 from the primary amplifier 193 that is diverted by coupler 22 into the frequency shifting modulator 25 will undergo another frequency shift to produce light comprising both a first frequency shifted component 193 and a second frequency-shifted component with a still higher discrete frequency 194. Essentially, the original frequency 192 is shifted to become the first frequency-shifted component 193 and the previous first frequency-shifted component becomes the second frequency shifted component 194. Therefore, the loop fiber 28 then carries both a first frequency-shifted component 193 and a second frequency-shifted component 194 to the primary amplifier 26. The light comprising these first and second frequency-shifted components 193, 194, after being amplified by primary amplifier 26, get added again in the variable coupler 22 to light from master oscillator 13 comprising the original frequency 192 so that the combined light waveform now has a developing frequency comb spectrum comprising the original seed frequency 192 as well as the first and second frequency-shifted components 193, 194.

By now it should be clear that each successive pass of a portion of the light through the frequency shifting modulator 25, primary amplifier 26, and back to the variable coupler 22 adds a new higher discrete frequency to the FIG. 8 frequency comb spectrum 35 of the light being delivered to the optical switch 24 and that this process continues indefinitely to some frequency n. With enough time and enough sequential passes of light through the primary loop of optical ring circuit 20, as described above, enough discrete frequencies 192, 193, 194, . . . , n are produced in the light delivered to the optical switch 24 that the plurality of discrete frequencies in the frequency spectrum of the pulses take on the appearance of teeth in a comb, as described above and shown in FIG. 8.

Discrete frequencies in the waveform spectral content can cause ambiguities in the range/Doppler signal processing, as mentioned above, which leads to "ghost images" separated by the Fourier transform of the frequency spacing. Specifically, the discrete nature of the generated waveform spectrum leads to satellite features in the auto-correlation function of the return signal with a temporal spacing equal to the Fourier transform of the discrete frequency spacing $\Delta v$ within the frequency comb spectrum 35'. Actually, the frequency comb spectrum 35 shown in FIG. 8 gets modified to some extent by optical switch 24 and secondary stage amplifier circuit 40, as will be explained below, but for purposes of the discussion in this paragraph, the frequency comb spectrum 35 in FIG. 8 is generated in the optical loop 20 by frequency shifting modulator 25. Such satellite features or "ghost images" can lead to ambiguity in range measurement if the range depth of the target T being interrogated is greater than the corresponding range spacing of the satellite features or "ghost images." Therefore, by decreasing the spacing $\Delta v$ between discrete frequencies 192, 193, 194, . . . , n in the frequency comb 35, the range depth of the target that can be accommodated without ambiguity is increased. Ideally, the desired frequency spectrum would be essentially "white light" having no discrete frequency content, thus a straight horizontal line (not shown) on FIGS. 5 and 8 with no "teeth" 192, 193, 194, . . . , n and no $\Delta v$ spacing, which would theoretically eliminate such ambiguities or "ghost images" in the return signal auto-correlation function and theoretically extend the possible range depth to infinity. Generating such a pure "white light" spectrum from a laser source with a bandwidth compatible with available detector technology is impractical for the ladar application of this invention. However, the smaller the spacing $\Delta v$ becomes, the closer the frequency comb spectrum 35 comes to the ideal "white light" spectrum and the less significant the ambiguities become. With selection of a suitable frequency shifting component 25, the optical loop 20 of this invention is capable of generating a frequency comb spectrum 35 with a very small spacing $\Delta v$, for example less than 1 MHz. Considering the need to maintain high diffraction efficiency in the acousto-optic modulator used as the frequency shifting modulator 25 in the embodiment of this invention as will be described below, a frequency shift of about 20–22 MHz by the frequency shifting modulator 25 to produce a frequency comb spectrum 35 with a frequency spacing $\Delta v$ of about 20–22 MHz has been shown to be practical and to produce very good range resolution for ladar applications, although smaller frequency shifts down to as little as 100 KHz may be desireable. Also, as mentioned above, an optional phase modulator with a large phase shift and a modulation period that is short in comparison to the transit time of the light around the primary loop of the optical ring circuit 20 described above can be used to randomize the phases of the different frequency components, producing incommensurate spectral frequency spacing, in order to reduce the energy in the "ghost" images or ambiguities in the auto-correlation function of the return signal to increase accuracy of range/Doppler detection, which will be described in more detail below.

The optical switch 24 is used to set the temporal profile 37 (FIG. 6) of the frequency comb pulses that are output on the output fiber 30 to the secondary amplification stage 40. The temporal profile is selected to compensate for gain saturation in the secondary amplification stage so as to lengthen pulse duration for improved velocity resolution. The optical switch 24 is actuated to prevent passage of the (cw) light from optical fiber 23 to output optical fiber 30 until it is time for an output pulse 37 of light to the secondary amplification stage 40, at which time the optical switch 24 is actuated by controller processor 210 to pass or gate such (cw) light for the desired time t duration and shaped profile to create the pulse 37 of light having a frequency content similar to the frequency comb spectrum 35. Then, the optical switch 24 is actuated or turned off again to block or divert the light from fiber 23 out of the system, which defines the end of the pulse 37. The frequency comb spectrum 35' (FIG. 5) of the output pulse in fiber 30 may not be exactly the same as the frequency comb spectrum 35 of FIG. 8, because the optical switch 24 may impart a further frequency shift to the beam, as will be described in more detail below. In addition, the width of each frequency component is preferrably increased to the Fourier transform of the gate duration. Also, the bandwidth, frequency comb, duration, and temporal profile of the light output on the output fiber 30 will not be precisely the same as the beam 80 transmitted from the telescope apparatus 60, because it also gets modified to some extent in the secondary amplification stage 40. However, these parameters in combination with the gain characteristics of the secondary amplification stage 40 do determine the overall energy, temporal duration, and, depending on the secondary amplification stage apparatus used, the basis for the spectral bandwidth of the transmitted pulse 80. As discussed above, it is desired to keep the frequency shift $\Delta v$ as small as possible to minimize ambiguity effects in range resolution or false target indications in the desired longer range depths, while a wide frequency bandwidth is also desired to achieve a large time-bandwidth product for maximizing range and velocity resolution. To achieve both of these objectives, many passes of light through the primary loop of optical ring circuit 20 are needed, requiring operation of the ring circuit 20 near unity round-trip gain. Also, shaping of the gated pulse to compensate for gain saturation in the secondary amplification stage 40, 40', 40" allows the extracted energy to be spread over a longer duration pulse, thereby lowering peak power while maintaining the spectral content for range resolution. For example, a shaped pulse width duration of about 500–1000 nsec may be switched out by optical switch 24 for input to a single pass or a double pass secondary amplification stage 40, provided sufficient energy is in the pulse produced by the optical loop 20 such that only single pass or double pass amplification in the second stage amplifier is needed to produce an output pulse 80 with enough energy to meet the return signal 84 strength required for the range depth of target t imaging desired for the system. However, a much shorter pulse duration, such as 100–300 nsec, may be desired for input to a multiple pass secondary amplification stage 40", because the additional energy required for return signal 84 strength and range depth can be added by the multiple pass amplifier, as will be described in more detail below. Since the laser pulse is coherent over its (100–1000 nsec) duration, the 1–2 kHz bandwidth associated with the pulse repetition frequency (PRF) and duration, rather than the 500 MHz spectral bandwidth, (chirped or otherwise) determines the system narrow bandwidth and hence velocity resolution. The range resolution is determined by the full spectral bandwidth.

Another beneficial function of the optical switch 24 is that, as it acts as a temporal gate between the cascaded primary amplifier 26 in the optical ring circuit and the secondary amplifier 46 in the secondary amplification stage 40, it blocks back-propagating amplified spontaneous emission (ASE) produced in the secondary amplifier 46 from reaching and gain saturating the primary amplifier 26. Spontaneous emission is extraneous light of unwanted frequencies that is produced in the cores of the amplifier fibers that is the equivalent of unwanted "noise" or "static" in an electronic circuit that can interfere with the desired function of the circuit. Therefore, it is desirable to keep ASE to a minimum in the circuit to maintain a signal as devoid of noise as possible as well as to minimize energy waste.

Figure 11:
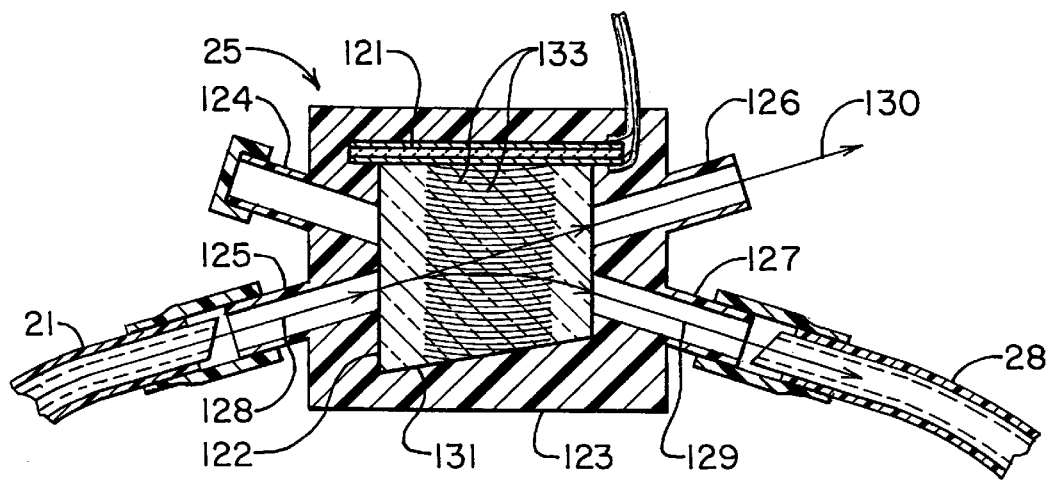
FIG. 11 is a cross-sectional diagrammatic view of an acousto-optic modulator that can be used in this invention for frequency shifting as well as for switching and coupling.

The frequency shifting modulator 25 is an acousto-optical device that uses acoustic (sound or ultrasound) energy to diffract and increase the frequency of the light pulses that pass through it. Suitable acousto-optical modulators for this purpose are available commercially, for example, the polarization maintaining (PM) fiber-pigtailed bulk acousto-optic traveling wave device manufactured by NEOS Technologies, Inc., of Melbourne, Fla., FIG. 11 illustrates diagrammatically the principal structure and functions of such devices to assist in describing and understanding the use of such devices in this invention. Essentially, a piezoelectric crystal 121 is driven by a high frequency oscillating electric voltage to generate and impart high frequency acoustical vibrations 123 to an optical piece or medium 122 that transmits light in the wavelength range that is being used in the system, but which also diffracts and increases the frequency of the light when excited by acoustic vibrations. Essentially, the acoustic waves function in a manner similar to a moving target to produce a Doppler shift in frequency. The resulting frequency of the diffracted beam 129 is equal to the frequency of the incident beam 128 plus the frequency of the acoustic vibrations 133. Such materials as crystalline or amorphous silicon dioxide ($SiO_2$), lead molybdenum oxide ($PbMoO_4$), tellurium dioxide ($TeO_2$), or AMTIR (amorphous material transmitting in the infrared) have these characteristics and are sufficiently rugged to avoid damage. The frequency shifter could also be some other suitable optical component, such as an all-fiber frustrated evanescent wave directional coupler, for example, manufactured at Southampton University in the United Kingdom, or a similar all-fiber frequency shifting device. The piezo electric crystal can be, for example, a lithium niobate crystal driven by an ordinary high frequency oscillator that is preferably adjustable to vary the acoustic vibration frequency, as is well within the knowledge and capabilities of persons skilled in this art. The optical piece 122 and piezo electric crystal 121 are contained in a housing 123 that has four optical ports 124, 125, 126, and 127. In the preferred embodiment of FIG. 2, optical port 125 may be connected to optical fiber 21 and used as the input port, while optical port 127 aligned on the first diffraction order of the optical port 125 can be used as the output port, thus is connected to the loop optical fiber 28. In this configuration, optical port 124 is not used and can be capped.

Most of a light beam 128 directed from fiber 21 via port 125 into the optical piece 122 is diffracted by the acoustic waves 133, which acts as a "thick" diffraction grating in the optical piece 122. The port 127 is aligned on the first diffraction order, so it allows the diffracted light beam 129 to exit the optical piece 122 and directs it into the loop optical fiber 28. In this diffraction process, the movement of the acoustic waves 133 through the optical piece 122 also gives the effect of a moving diffraction grating, which Doppler shifts, thus increases the frequency of the diffracted light, so the light beam 129 is frequency shifted to a slightly higher frequency than the input beam 128, as described above. The amount of the frequency shift, as described above, is essentially equal to the frequency of the acoustic waves 133. A small portion of the input light beam 128 is not diffracted and is allowed to exit the system as a nondiffracted beam 130. In this configuration, the nondiffracted beam 130 is wasted, thus an energy loss to the system, so efficiency and tuning should be maximized to minimize such loss. In an acousto-optical modulator 25 that uses an AMTIR optical piece 122, and appropriate piezo electric crystal oscillation frequency and energy to shift the frequency of the light by about 20–22 MHz as described above, about eighty percent (80%) of the input beam 128 energy is diffracted into output beam 129, while the remaining twenty percent (20%) of the input beam 128 energy remains nondiffracted and in the waste beam 130. The bottom surface 131 of the optical piece 122 opposite the piezo electric crystal 121 is preferably slanted to prevent destructive reflection of the acoustic energy waves 133 from setting up a standing wave acoustic grating, which would be non-frequency shifting.

The primary amplifier 26, as mentioned above, is provided in the optical ring circuit 20 to circumvent power losses in the optical ring circuit 20 and makes up for energy that is gated out of the optical ring circuit 20 to the secondary amplification stage 40. As also mentioned above, the amplifier 26 is preferably, but not necessarily, a fiber amplifier, such as an erbium doped fiber amplifier (EDFA), which acts as a continuous wave amplifier.

Figure 12:
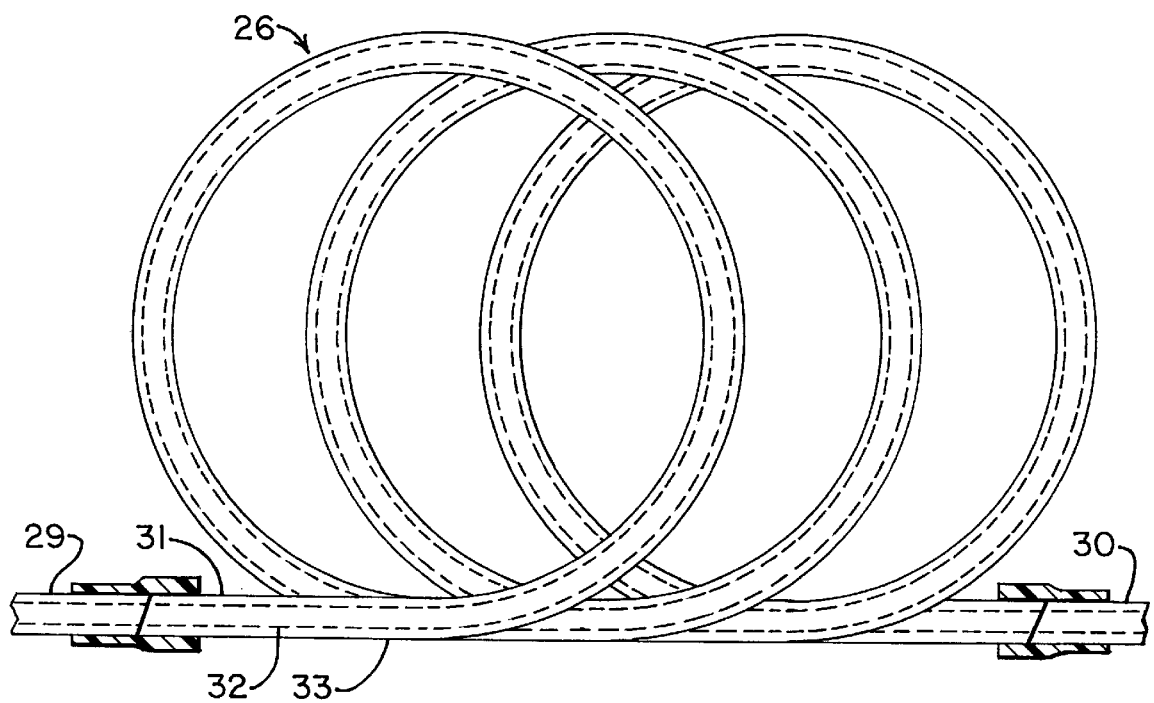
FIG. 12 is a diagrammatic view of a doped fiber amplifier used in this invention.

Referring to FIGS. 2 and 12, the doped fiber amplifier 26 comprises a length of optical fiber 31, the core 32 of which conducts light in the conventional manner of an optical fiber, but which is also doped with ions that can be pumped with energy sufficient to function as a pumped laser source. Erbium ions have a certain energy level distribution that allows them to store energy received or pumped by another light source at one wavelength until a certain threshold is reached, whereupon it emits laser light. Therefore, while not necessary, it is preferred that the fiber amplifier core 32 is doped with erbium—thus, the preferred fiber amplifier 26 embodiment for use in the invention is an erbium-doped fiber amplifier (EDFA). Such erbium-doped fiber amplifiers (EDFA's) are well-known in the art for amplifying light wavelengths of about 1.5 µm. With the core 32 doped with the same material as the master oscillator 13—erbium in the case of the preferred embodiment being described—the core 32 is capable of amplifying (producing laser output signals) in the same frequencies as the light in the optical ring circuit 20 as described above.

The EDFA1 26 may have, for example, a PANDA (polarization maintaining) type stress member geometry to maintain compatibility with other components in the system that use PANDA fibers, and the core host 32 may be germano-silica with an erbium ion concentration of about 200 ppm by weight. The fiber numerical aperture may be about 0.18 with cutoff wavelengths of nominally 725 nm (slow axis, containing stress members) and 1,000 nm (fast axis). Such EDFA fibers are manufactured by Pirelli Cavi SpA in Milan, Italy. For an input power from a pump light source 100 of about 100 mw, the optimum length for the fiber 33 of the EDFA 26 is about 12 m.

The EDFA1 26 is preferably designed for optical pumping at 980 nm, since this pump band in erbium suffers least from up-conversion processes. For efficient operation of the EDFA1 26, the overlap between the pump mode and the doped core 32 of the fiber 33 should be maximized. Also, for improved stability, the fiber 33 is single mode at the pump wavelength (e.g., 980 nm) as well as at the signal wavelength (e.g., 1532 nm), which prevents competition and associated amplitude noise. The cutoff wavelengths of 725 nm (slow axis) and 1,000 nm (fast axis) mentioned above correspond to threshold values below which the fiber 33 can support the next higher order mode ($LP_{11}$). Therefore, the fiber 33 described above is only strictly single mode at both pump wavelength (980 nm) and signal wavelength (1532 nm) for pump light polarized along the slow polarization axis. Thus, the pump light in this example embodiment should be polarized along the slow polarization axis. While the signal light may be polarized in either orientation, there is a small increase in gain when the polarizations of the pump light and the signal light are matched. Therefore, it is preferred that slow-axis propagation for both the signal light and the pump light be used. Also, a high numerical aperture (NA) for the fiber 33 is preferred for efficient (cw) signal amplification with the fiber gain saturated. The relatively large NA (0.18) of the Pirelli manufactured fiber mentioned above is consistent with this design parameter. The overall gain of the optical ring circuit 20, considering losses in the ring components balanced against gain in the primary amplifier 26, is preferably just under unity to prevent oscillation in the primary loop of the ring circuit 20. Therefore, the frequency comb 35 in FIG. 8 produced by the optical ring circuit 20 has decreasing relative intensity or amplitude in each successive frequency component 192, 193, 194, . . . , n. This same frequency profile is also observable in the actual frequency comb example 35' in FIG. 5.

Pump light, which provides the additional power in the amplifier 26 necessary for amplifying the above-described signal in the optical ring circuit 20, is produced and provided by the pump light source 110 shown in FIG. 2. Essentially, the pump light source 110 comprises a laser diode 111 that produces a continuous wave, single frequency laser beam 112. This laser beam 112, which is a shorter wavelength, higher frequency light than the frequency comb spectrum of the signal produced in the optical ring circuit 20 described above, such as, for example, 980 nm wavelength. A model SLD-5760-A master oscillator/power amplifier (MOPA) laser diode 111 manufactured by Spectra Diode Labs of San Jose, Calif., operating at 982 nm is satisfactory for this purpose. When coupled by a pump telescope 113 and a polarizing fiber port (PFP) 114 into a single mode fiber 115, the (cw) laser beam 112 produced by this MOPA 111 has sufficient power to pump both the primary amplifier 26 and the secondary amplifier 46 simultaneously. The pump variable coupler PV 116 divides the light beam 112 into single mode fiber 117 for routing to the primary amplifier 26 and into single mode fiber 118 for routing to secondary amplifier 46 in the secondary amplification stage 40. The pump power coupled into the primary amplifier 26 (EDFA1) can be, for example, about 100 mW, as mentioned above. Of course, separate pump light sources can be used for the primary amplifier 26 and secondary amplifier 46, if desired.

Figure 13:
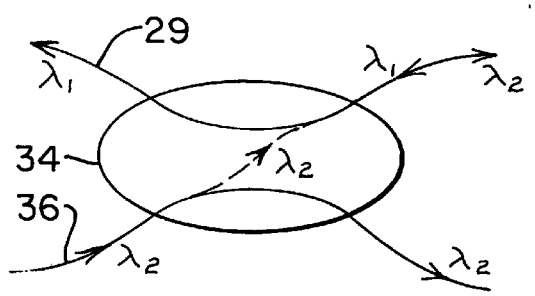
FIG. 13 is a schematic representation of the function of a wave division multiplexing coupler as used in this invention to couple pump light energy into the fiber amplifier circuits.

To couple the pump light from MOPA source 111 to the erbium-doped fiber 33 of the primary amplifier 26 in optical ring circuit 20 while preventing substantial loss to the signal in the optical ring circuit 20, the pump light is passed from fiber 117 through a polarization-maintaining wave-division multiplexing coupler (WDM1) 34. As shown schematically in FIG. 13, the WDM1 34 passes power of the pump light wavelength $\lambda_2$ (about 982 nm in the example) from fiber 36 to fiber 29 in the optical ring circuit 20, but it does not pass power of the signal light wavelength $\lambda_1$ (about 1532 nm in the example) efficiently from fiber 29 to fiber 36. The actual mode coupling in a WDM device is more complex than this diagram in FIG. 13, but the illustrated function is the desired light coupling result. A wave-division multiplexing coupler 34 to accomplish this function can be assembled by using a coupler similar to the coupler 90 shown diagrammatically in FIGS. 9 and 10 using polarization maintaining fibers, such as Fibercore (trademark) HB-1250. Essentially, the length of the contact area between the two fibers 29, 36 determines the wavelength of light that will couple and pass from one fiber to the other. Therefore, in this case, the length of contact area can be chosen to couple light at wavelengths less than some threshold, such as about 1250 nm, from one fiber into the other, but not wavelengths over that threshold. Such wave-division multiplexing couplers are also available commercially from Canadian Instrumentation and Research, Inc., of Burlington, Canada. This configuration can allow more than eight-five percent (85%) of the incident pump power (about 980 nm) to be coupled into the erbium-doped fiber 33, while introducing minimal loss of signal light (about 1532 nm) in the signal path. Transmission losses in a system can be kept to a minimum by using fibers with similar numerical apertures (NA) and cutoff wavelengths which is not always possible with the limited variety and optical characteristics of components currently available. The WDM1 coupler 34 described above, made from Fibercore (trademark) HB-1250 fibers, has a 0.14 NA, which provides a compromise between the relatively low NA of 0.11 of the Fujikura (trademark) fiber used in the optical ring circuit 20 and the 0.18 NA of the Pirelli (trademark) fiber used in the EDFA1 26 to result in a combined transmission loss of about 2 dB. Loss of this magnitude is acceptable, because the EDFA1 26 fiber has high gain, and the optical ring circuit 20 is not required to generate a high average power.

The pump light from the pump light source 110 is introduced into fiber 29 via the wave-division multiplexing coupler 34, as described above, preferably downstream of the EDFA1 26, so that the pump light is back-pumped into the erbium doped core 32 of the primary amplifier fiber 31 shown in FIG. 12, where its energy is used to amplify the signal from the frequency shifting modulator 25. Such back-pumping of the pump light counter to the propagating signal beams is the preferred orientation for fiber amplifiers operating under saturated gain conditions to minimize forward ASE. The EDFA1 amplifier 26 is preferably a small core 32 fiber with a large numerical aperture (NA), to maintain single mode light transmission and high gain. As mentioned above, high gain in this EDFA1 26 is required to get the seed signal from the master oscillator 13 to saturate the EDFA1 26 in order to generate all of the successive frequency content 192, 193, 194, . . . , n of the frequency comb 35 in FIG. 8, preferably over at least a 500 MHz bandwidth, although the overall gain of the optical ring circuit 20 has to be kept slightly below unity to prevent oscillation, which would have the undesireable effect of generating excessive bandwidth beyond the detection capability of large dynamic range photodiode suitable for imaging applications. The small core 32, single mode fiber 33 in the amplifier 26 also is coupled more easily with the single mode fibers that are preferably used throughout the transmitter portion of the system 10 to ensure that a single spatial mode profile is emitted from the telescope 60, which is beneficial for ladar imaging. To maintain single mode transmission of light in a fiber, called single mode fiber (SMF), it is well-known that the normalized frequency V of the fiber has to be less than 2.405, where:

$$V = \frac{2\pi\rho}{\lambda} NA,$$

and where $\lambda$ is the wavelength of the light, $\rho$ is the radius of the core, and NA is the numerical aperture. The numerical aperture $NA = n_1 \sqrt{2\Delta}$, where $\Delta$ is a measure of the relative difference between the core refractive index $n_1$ and the cladding refractive index $n_2$, and $\Delta \cong (n_1 - n_2)/n_1$. Therefore, for high gain it is preferred to keep the core 32 radius $\rho$ small and the numerical aperture NA high in a ratio that still keeps V<2.405 in order to maintain single mode propagation. When the (cw) seed signal from master oscillator 13 is present, ASE is clamped at low gain, so very little is produced in the EDFA1 amplifier 26 when designed as described above.

The amplified signal in the 1.5 $\mu$m range from the EDFA1 primary amplifier 26 passes through the wave division multiplexing coupler (WDM1) 34 in fiber 29 without crossing back to fiber 36, which carries the 0.98 $\mu$m wavelength pump light. It then passes through a polarizer 27, such as a model no. I-15 PTM-O-2 fiber pigtailed polarizer, manufactured by Isowave, of Dover, N.J., or any other commonly known polarizing device, to clean up the polarization of the amplified light in the fiber 29 before it reaches the coupler 22. As described above, a portion of the amplified light energy is coupled into fiber 21 for another trip around the primary frequency shifting amplifier loop of optical ring circuit 20, while the remainder of the light energy in fiber 23 along with some light energy coupled from fiber 21 is directed to the optical switch M2 24, were it is chopped into intermittent pulses of light energy, with each pulse comprising the frequency comb signal temporal profile of FIG. 8, as discussed above. The optical switch M2 24 is preferably, but not necessarily, an acousto-optic modulator similar to the acousto-optic frequency shifting modulator M1 25 described above. However, if a non-frequency shifting optical switch is desired, an amplitude modulated Mach-Zender device could be used. It is theoretically possible to use an acousto-optic device in a non-frequency shifting configuration by using the port 126 for the normal output and to prevent light from passing, i.e., to turn "off" the optical switch 24. The acoustic transducer 121 would be turned "on" to diffract the light beam away from port 126. However, this configuration is not preferred due to finite diffraction efficiency of the modulator leading to poor isolation in the "OFF" state..

When the optical switch M2 24 is an acousto-optical modulator in the frequency shifting configuration as preferred, it is also preferred that it operate at a high frequency, for example about 100 MHz, to allow better controlled shaping of the gated pulse.

The modulator switch M2 24 also acts as a temporal gate to prevent amplified spontaneous emission (ASE) from the secondary power amplifier 40 from back-propagating into the primary amplifier 26 and causing gain saturation from unwanted ASE instead of from the (cw) seed signal. An optional optical isolator 38, such as a model IO-F-IR manufactured by Optics for Research Inc., of Caldwell, N.J., can also be positioned between the optical ring circuit 20 and the secondary stage amplifier 40 to provide additional isolation from back propagating ASE.

As the pulsed beam with the frequency comb waveform profile emerges on fiber 44 from optical ring circuit 20 (see FIG. 2), the laser light is still polarized with the e-vector extending into the paper, as indicated by symbol 17 on that fiber 44. Several embodiments of the secondary or power amplification stage 40 are illustrated and described for this invention. The single pass second stage amplifier embodiment 40 shown in FIG. 2, where the light pulse undergoes only one pass through the power amplifier 46, provides the least power amplification and can be used for shorter range ladar systems. It is also useful where longer duration, thus higher energy, pulses are produced by the optical ring circuit 20 so that the ladar system 10 is not so dependent on higher power amplification in the secondary stage amplifier 40 to reach the energy levels required for the range or depth of target T. This single pass power amplifier configuration of FIG. 2 essentially just amplifies the pulses produced by the optical ring circuit 20 without changing the frequency content, bandwidth, or duration of the pulse, provided that the pulse profile produced in the optical ring circuit 20 is shaped to compensate for exponential gain saturation in the second stage power amplifier 46..

Figure 3:
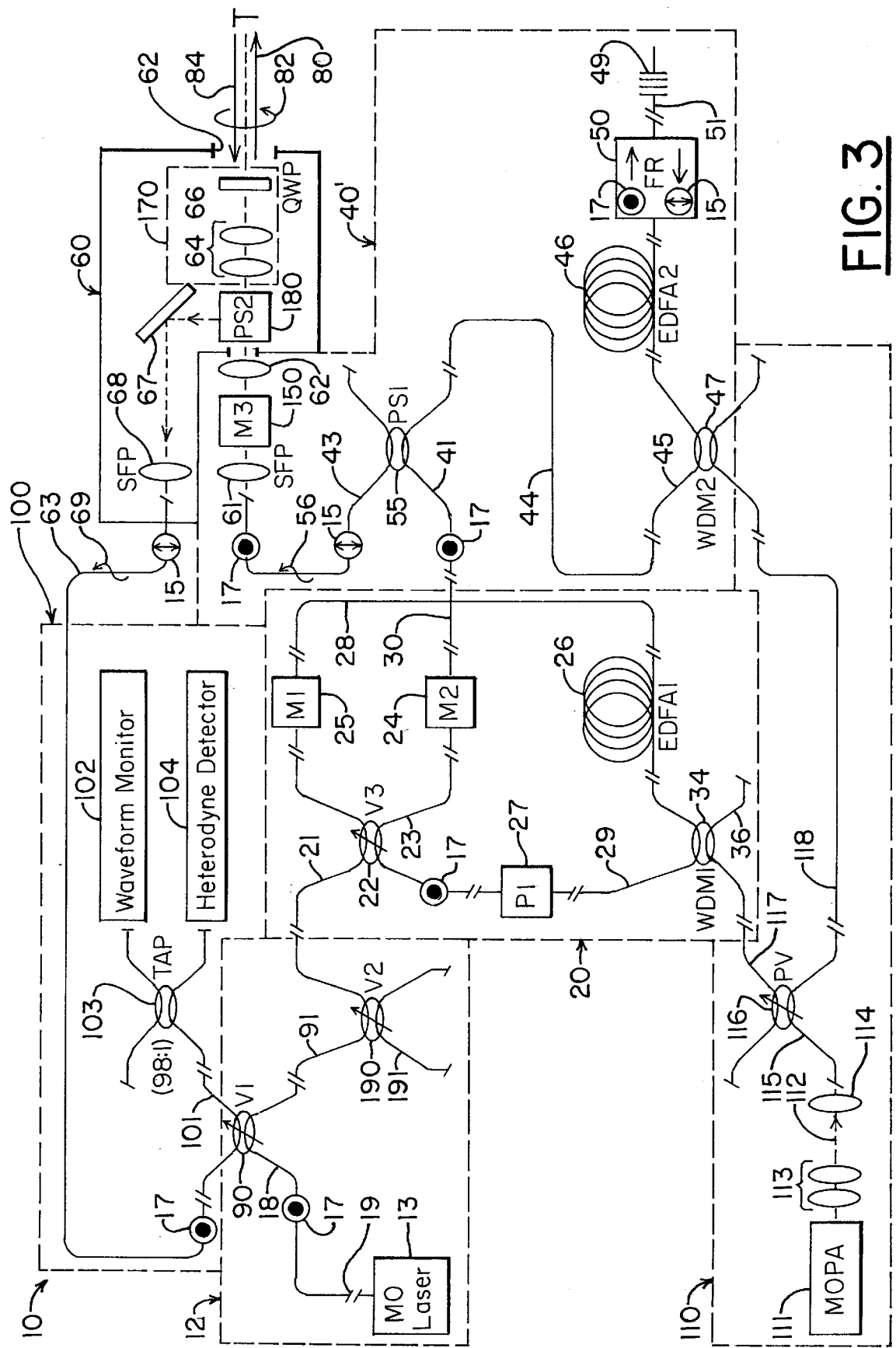
FIG. 3 is a diagrammatic view similar to FIG. 2 of an alternate embodiment ladar system of this invention in which double pass fiber amplification is used for second stage power amplification.

The secondary amplification stage 40' of FIG. 3 is a double pass configuration in which the light pulse from optical ring circuit 20 undergoes two passes through the power amplifier 46. This double pass amplifier configuration 40' has the advantage of achieving better energy extraction out of the power amplifier 46 while still maintaining the frequency content, bandwidth, and duration of the pulse from the optical ring circuit 20.

A third embodiment 40" of the secondary amplification stage illustrated in FIG. 4 is a multiple (greater than two) pass configuration in which the beam pulse from the optical ring circuit 20 undergoes multiple passes through the power amplifier 46. Such a multiple pass power amplifier 40", which can be formed by placing the optical amplifier 46 in a loop, is fairly insensitive to the power or energy level of the pulsed beam signal emitted from optical ring circuit 20, since multipass pulse amplification drives the amplifier 46 into saturation regardless of the input pulse signal energy. Therefore, such a multiple pass configuration is optimum for energy extraction from the amplifier 46. However, it requires net gain in the loop to accomplish efficient energy extraction. To ensure that the energy stored in the amplifier 46 from the pump light source 100 is extracted by the pulse signal input from the optical ring circuit 20 rather than by ASE build-up, an additional acousto-optic modulator 151 is used in the loop to act as a temporal gate to prevent laser oscillation prior to injection of the input pulse beam signal from optical ring circuit 20. In addition, a narrow band filter 152 discriminates against broadband ASE build-up during multiple-pass amplification of the relatively narrow band signal, as explained above. The acousto-optic modulator 151, of course, also increases the transmitted waveform bandwidth by the input frequency at which the acousto-optic modulator 151 is operated for each pass of the pulse beam signal through the acousto-optic modulator 151. Consequently, the overall temporal profile and spectral bandwidth of the output beam from the second stage multiple pass amplifier configuration 40" in FIG. 4 are both determined by the number of loop transits required to extract the pump light energy stored in power amplifier 46. This configuration has the advantage of adding additional frequency content and phase randomization to the spectral bandwidth of the output beam pulse, which, as explained above, can reduce satellite features in the ladar range autocorrelation function of the return signal 84 and thereby decrease ambiguities in range resolution for increased range depth of the target T. However, it not only adds complexity to the amplifier design and apparatus, but the multiple frequency shifts from multiple passes of the beam pulse signal through the acousto-optic modulator 151 causes the output beam pulse 80 to be deficient in low frequency content. Unfortunately, such deficiency in low frequency content can cause a "ringing" feature in the compressed return signal 84 that can actually lead to ambiguity when the signal to noise ratio (SNR) is low. Consequently, the single pass secondary stage amplifier 40 of FIG. 2 or the double pass secondary stage amplifier 40' of FIG. 3 are, on balance, preferred for applications in which they can provide the energy needed for the ladar range and target imaging specifications desired for a particular ladar system.

Returning now to FIG. 2, as mentioned above, it is preferred, although not essential, that single mode fiber be used throughout the ladar system 10, especially in the source components 12, optical ring circuit 20, secondary stage amplifier circuit 40, and transceiver 60, in order to ensure that a single spatial mode profile is emitted from the telescope 64, which is beneficial for ladar imaging. Essentially, the mode in a single mode fiber approximates a Gaussian distribution, which is preferred for propagation through the atmosphere. A Gaussian beam transmitted in the atmosphere will remain Gaussian in free space propagation, even though the mode size spreads or expands. Therefore, the return signal 84 will produce a good overlap with the local oscillator signal in the detector 100. Another advantage is that good overlap between signal light and the pump light is needed in the amplifiers 26, 46, which is best achieved with single mode fibers.

Also, it is preferred, although not essential, to use polarization maintaining (PM) components and fibers throughout the ladar system 10 to facilitate beam transmission, routing, and separation in the various components and fibers. The same polarization is also needed for high heterodyne beating efficiency in the detector phase 100.

There are a variety of polarization maintaining (PM) fibers available commercially, such as "PANDA"-type fibers manufactured by Fujikura, Ltd., and distributed by Corning Incorporated of Corning, N.Y. In this type of fiber, the core is placed symmetrically between two cylindrical stress members made of borosilicate glass. The refractive index variation between the borosilicate stress members and the silica fiber cladding creates a difference in the propagation constants of the fiber mode parallel and orthogonal to the axis containing the stress members. The result is negligible coupling from one axis to the other, provided linearly polarized light is coupled into the fiber with its polarization oriented to one of the axes.

As also described briefly above, key components in a fiber based system, such as the one illustrated in FIG. 2, are the four-port couplers 90, 190, 22, 103, which are functionally equivalent to conventional beam splitters in a bulk optical system. They operate by bringing the cores 96 of two fibers 18, 101 into close proximity with each other, as illustrated in FIG. 10, so that their individual modes are replaced by a "supermode" that provides evanescent cross-coupling between the fibers 18, 101. The degree of cross-coupling is a complex function of interaction length, core spacing, and individual fiber propagation parameters. A wide variety of couplers are available commercially, including fixed and variable ratio signal couplers and wave division multiplexing (WDM) couplers, as described above. The need to preserve polarization in fiber couplers adds an extra degree of complexity, but it is accomplished by ensuring that the polarization eigenaxes of the two fibers 18, 101 are co-aligned to a high degree of accuracy (<0.5 degree relative orientation) in the coupling region. This co-alignment is most readily achieved by polishing the two fiber halves making up the coupler to within a few microns of the fiber cores in a rig that controls relative fiber orientation during the polishing process. Similar control on fiber orientation can also be accomplished during fused taper coupler fabrication, which reduces manufacturing costs. As mentioned above, such couplers are available commercially from Canadian Instrumentation and Research, Inc., of Burlington, Canada.

As also illustrated in FIG. 2, the coupler VI 90 is used to split the available light from master oscillator 13 to provide both a seed signal for the amplifier 26 in optical ring circuit 20 and local oscillator power for the heterodyne detection of the return signal in the sensor circuit 100. Coupler V2 190 in conjunction with coupler V3 22 is used to control seed injection into the primary loop of the optical ring circuit 20, while coupler V3 22 is used to adjust the input and output coupling from the primary loop in optical ring circuit 20. Variable ratio couplers at these locations can provide full control and adjustment of the power levels in the optical ring circuit 20 and routed toward the receiver circuit 100, which offers flexibility in design and waveform production. However, fixed ratio couplers, which are less expensive, smaller, and more durable can also be used for designs where variability and flexibility is not needed.

As shown in FIG. 2, for a single pass amplifier design, the pulse beam signal from optical ring circuit 20 is routed via fiber 44 and another fiber 45 to the second stage fiber amplifier 46, which is the operative amplifying component of the second stage amplifier 40. The polarization of the pulse beam signal is still oriented with the e-vector extending into the plane of the paper as indicated at 17. A wave division multiplexing coupler (WDM2) 47, similar to the WDM1 34 in the optical ring circuit 20, is positioned in the fiber 45 for coupling the 980 nm wavelength pump light from source 110 into the second stage fiber amplifier 46 while inhibiting loss of pulse beam signal from fiber 45. The pump light is routed from the source, MOPA 111, via the pump coupler PV 116, as described above, to WDM2 coupler 47 via fiber 118.

The fiber amplifier 46 is preferably, but not necessarily, an erbium doped fiber amplifier (EDFA2) for much the same reasons relating to wavelength as discussed above for the primary amplifier 26. However, this second stage amplifier 46 is designed primarily for power amplification in order to produce a strong enough beam signal 80 for transmission to the target T, which may be many miles away, and to receive back a sufficiently strong reflected beam signal 84 for detection and measurement of the critical parameters or characteristics discussed above i.e., Doppler frequency shift and frequency profile signature. Therefore, this second stage amplifier 46 is preferably designed with a large doped core diameter to increase the number of ions in the fiber core region for absorbing and storing large amounts of energy for extraction in each amplified pulse, but with restricted gain to minimize the depletion of stored energy in the large core by unwanted amplified spontaneous emission (ASE), which can be more of a problem in high energy pulsed fiber amplifiers than in continuous wave (cw) amplifiers. Whereas the desired high gain in the primary amplifier 26 is obtained by selecting fiber parameters of small core diameter and large numerical aperture (NA), as described above, the desired high energy storage and simultaneous reduction in gain in the power amplifier 46 in this embodiment is obtained by selecting a large core diameter and a correspondingly low numerical aperture (NA). It would be ideal to have a progressive distribution of a plurality of narrow band filters in the fiber 33 to filter out ASE in the amplifier fiber 33 so that higher gain could be used. However, for practical reasons, such an arrangment is not necessary.

Selection criteria of the erbium-doped fiber for the power amplifier 46 is based on very different requirements than the selection criteria for the primary amplifier 26. Whereas (cw) signal amplification benefits from increased gain in a fiber with a large numerical aperture (NA) and small core size, the opposite is required for optimization of a pulsed power amplifier. In the latter case, a low NA and large core are required to reduce ASE depletion of stored energy between pulses and to increase the number of ions in the fiber core region for energy storage, as described above. The increase in core size is important, because, as in other laser systems, an increase in laser ion concentration beyond a certain value (~200 ppm for erbium-doped germano-silica glass fibers) leads to ion-ion interactions that reduce the laser upper state lifetime, thus limit energy storage in the laser medium. A better core host glass for this purpose is alumino-silica, which allows dopant concentrations up to 500–600 ppm without noticeable reduction in the 10 msec upper state lifetime. The lower emission cross-section of erbium in this glass ($\sigma_e = 4.4 \times 10^{-21}$ cm$^{-2}$) also reduces laser gain, hence reducing ASE build-up.

The limitation on fiber numerical aperture (NA) reduction in the power amplifier 46 is twofold. At low values of NA, controlling the refractive index difference between the fiber core and cladding during fabrication is difficult, and ripples in the refractive index become more significant, leading to loss of waveguiding properties. Furthermore, transmission loss associated with macro- and micro-bends in the fiber increase rapidly with NA reduction much below values of 0.08. Based on these considerations a fiber with the following characteristics has provided satisfactory performance for power amplification:

| Parameter | Specification |
| --- | --- |
| Core Composition | Al/Si (Al$_2$O$_3$—SiO$_2$) |
| Dopant Ion | Er$^{3+}$ |
| Dopant Concentration (ppm) | 200 |
| Numerical Aperture | 0.08–0.09 (measurement-limited) |
| Cutoff Wavelength (nm) | 960 |
| Background Loss (dB/km @ 1400 nm) | <10 |
| Cladding Diameter ($\mu$m) | 125 |
| Coating | UV acrylate (low particulate size, cladding mode stripping) |

The requirement for a low particulate size in the UV acrylate coating is to minimize the effect of microbend loss in the fiber. Such a fiber is available from Optoelectronics Research Center, Southampton University, U.K. The fiber is preferably, but not necessarily, mounted in a loosely coiled fashion so as to reduce microbend loss through applied force on the outer surface of the fiber. A coil radius above about 4 cm is suitable to prevent macrobend loss in the fiber.

Ideally, the low NA doped fiber of power amplifier 46 should also be polarization-maintaining (PM). It is preferred that a fiber with PANDA-like stress members be used for polarization maintenance for high polarization isolation (short beat-length). However, the light guided mode in the low NA fiber extends significantly into the cladding region, where it can interact with the stress members. Therefore, careful location of the stress members and approximate material selection is desired to achieve good polarization maintenance (short "beat-length") while maintaining low transmission loss for the guided mode. However, acceptable results can also be obtained using non-polarization maintaining fibers if care is taken in positioning the fiber so as to minimize birefringence and thereby maintain as good a linear polarization state in the fiber as possible. A fiber NA of about 0.09 is satisfactory. The fiber length can be set to ensure that the residual pump power emitted from the fiber end is about two times the pump saturation power to eliminate ground state absorption at the signal wavelength, but it can be adjusted empirically to achieve optimum results.

The pump light is shown in FIG. 2 as being coupled into the power amplifier 46 upstream. However, it could be coupled into the fiber downstream of the power amplifier 46 for counter-propagating pumping, which in some circumstances may provide more efficient pump coupling with the power amplifier 46. In the single pass power amplifier configuration of FIG. 2, as described above, pump power in the range of 200 to 400 mW is appropriate with the amplified output beam in the range of about 50 to 100 mW being feasible.

The ladar system 10 may operate with a signal to noise ratio (SNR) of about 10 to 15 dB for image clarity. To achieve this kind of SNR with weak return signal 84 powers available from remote backscatter, it is preferred to manage ASE in the system as effectively as possible, because ASE acts as an additional noise source in the heterodyne detection scheme. Therefore, another acousto-optic modulator 150 is positioned at the output end of the power amplifier 46 to gate out ASE generated in the power amplifier 46 during the time of flight and detection period of the return ladar pulse 84, so that such ASE does not get detected along with the return pulse signal 84. The acousto-optic modulator M3 150 can also be used to compensate for frequency shift in the pulse signal introduced by the optical switch acousto-optic modulator M2 24. Another use of the acousto-optic modulator M3 150 can be to compensate for velocity of a moving carrier of the ladar system 10, such as an airplane.

To compensate for the low gain and to get more energy extraction from the power amplifier 46, it may be preferred to use a double pass configuration 40' for the second stage doped fiber amplifier 46, as illustrated in FIG. 3. To accomplish such double pass signal amplification, the pulse signal generated by the optical ring circuit 20, which is polarized in one plane or direction 17, is first passed in one direction through the second stage amplifier 46. The resulting first pass amplified signal, which extracts some of the stored pump energy from the large diameter core, is directed into a Faraday rotation device 50 and a Bragg fiber grating 49, the combined action of which reverses the first pass amplified signal and sends it back through the doped fiber amplifier 46 for a second pass in a plane of polarization 15 rotated 90 degrees from the first pass plane of polarization 17. The Bragg grating prevents double pass amplification of ASE by allowing the broadband ASE to pass out of the system, but it fully reflects over the signal bandwidth to send the signal back through the EDFA2 46 for another amplification pass. Since the gain of optical fiber amplifiers is essentially polarization independent, this second pass of the signal results in additional amplification of the first pass amplified signal, thus extracting more of the stored pump energy from the large diameter doped core of the fiber amplifier 46.

Figure 14:
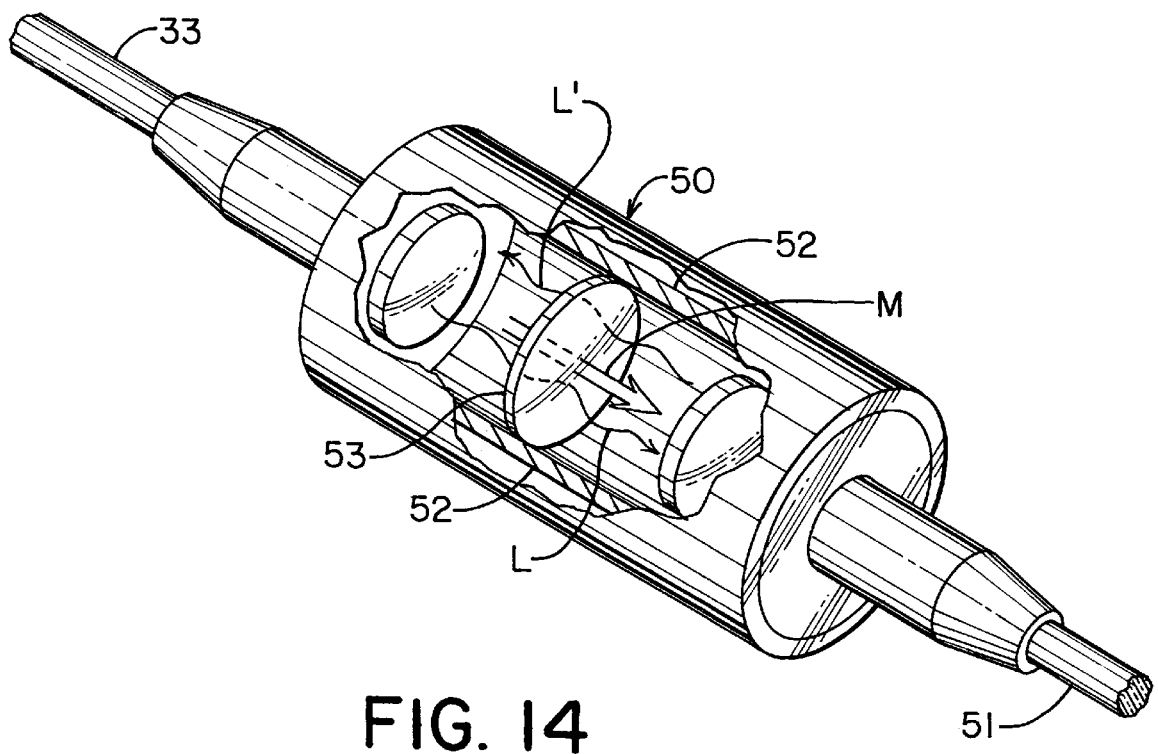
FIG. 14 is a diagrammatic perspective view of a magneto-optic Faraday rotation device used in the double pass second stage fiber amplifier embodiment of this invention that is illustrated in FIG. 3.

Essentially, a Faraday rotation device 50, utilizes a magnetic field to rotate the plane of polarization of light being propagated in a medium. A Faraday rotation medium, such as yttrium-iron-garnet (YIG) or terbium-gallium-garnet (TTG) crystal or bismuth-substituted iron garnet films (BIG), when in the presence of a fixed (dc) magnetic field, will rotate the polarization of light in the same direction regardless of the direction of the light propagation. For example, a Faraday rotation device 50 for use in this invention, as described above, is illustrated diagrammatically in FIG. 14. The light L from the fiber 46 of the EDFA2 46 is transmitted through an optical medium 53, such as the YIG, TTG, or BIG described above. The polarization of the light L propagated in the medium 53 is rotated by a magnetic field M created by a magnet 52 adjacent the medium 53. The strength of the magnetic field M is designed with the medium to produce a rotation of the polarization of the light L by 45 degrees. The Bragg filter 49 (FIG. 3) reflects the light back through the medium 53 again as indicated at L'.

The lenses 57, 58 mode match the light L and return light L' to the fibers 46, 51. As mentioned above, a significant characteristic of Faraday or magnetically induced rotation of the polarization in this kind of device 50 is that the rotation is independent of the direction of light propagation. Therefore, the rotation of the polarization is doubled rather than undone by reflecting the light beam back through the magnetic field M in the medium 53. Consequently, the reflected light L' that emerges from the Faraday rotation device 50 has its plane of polarization 17 rotated 90 degrees to the plane of polarization 15, as denoted in FIG. 3. A suitable Faraday rotation device 50, preferably with a BIG Faraday rotating material, for use in this invention can be obtained commercially from Optics for Research, Inc., of Caldwell, N.J.

An alternative configuration (not shown) is to replace the Bragg filter 49 with a reflective surface, such as a spectral mirror (not shown). However, in such a configuration, the ASE would also be reflected back into the EDFA2 46 for another pass, which would usurp energy and add noise to the signal.

Therefore, the light beam signal on its second pass in counter-propagation through the second stage or power fiber amplifier 46 in FIG. 3 is in the plane of polarization 15, whereas the light signal emerging from the optical ring circuit 20 and which is forward propagated on the first pass through the power amplifier 46 is in the plane of polarization 17, as discussed above. The 90 degree rotation of the plane of polarization of the amplified signal emerging from the second pass through fiber amplifier 46 is used to split the second stage amplified signal out of fiber 41 and route it into fiber 43 for propagation to the telescope apparatus 60. This splitting is accomplished by a conventional polarization splitter 55, which is a well-known device to persons skilled in the art and can be obtained commercially, for example, from Canadian Instrumentation and Research, Inc., of Burlington, Canada.

The plane of polarization of the light beam carrying the amplified signal from the second stage amplifier 40 is in the plane 15, as indicated in FIG. 3. However, because the fiber 43 is polarization maintaining fiber, such as Fujikura™ SM.15P-8/125-400/400 fiber, the fiber 43 itself can be twisted 90 degrees, as indicated by arrow 56, to deliver the beam to the telescope apparatus 60 in the plane of polarization 17.

In the embodiment shown in FIG. 3, the fiber 43 is terminated at a signal fiber port (SFP) with collimating lens 61, e.g., a 6 mm focal length lens, and the light beam carrying the second stage amplified signal in the plane of polarization 17 is directed into the modulator switch M3 150. This modulator switch M3 150 could be a fiber connected two or four port acousto-optic modulation device similar to the frequency shifting modulator 25 illustrated in FIG. 11 and to the optical switch modulator 24 in the optical loop circuit 20 if the fiber 43 is not terminated at the SFP and lens 61. However, in this embodiment of FIG. 3, the modulator M3 150 is illustrated as a free space component, which operates essentially the same as the fiber connected modulator switches described above. As also explained above, this modulator switch 150 can be turned on and off by control signals from the controller processor 210 to function as a temporal gate, which can be turned off as soon as the output beam 80 is transmitted to block amplified spontaneous emission (ASE) produced in the fiber amplifier 46 after the desired pulse is transmitted in the output beam 80 from feeding back into the sensor or receiver circuit 100 when the return beam 84 is received. The modulator switch M3 150 can also be used to introduce a frequency shift to compensate for any unwanted frequency shift from the optical switch modulator 24 or to introduce a frequency shift to compensate for movement of the platform carrying the transceiver 10 itself, as described above for the FIG. 2 embodiment. For this latter function, different parts would be used, depending on whether the frequency shift is to be an increase or a decrease, as would be known to persons skilled in the art once the desired function is determined according to this invention. As mentioned above, the frequency combination bandwidth of the output beam 80 produced in the double pass power amplifier 40' of FIG. 3 is essentially the same as the signal produced by the optical ring circuit 20.

The second stage power amplifier 40" illustrated in FIG. 4 is a multiple pass looped configuration, which allows more power amplification of the ladar signal than was possible with single and double pass embodiments 40, 40' described above. However, the multiple passes through modulator switch M3 151 used in this configuration introduces additional multiple frequency shifts in the signal. Such additional multiple frequency shifts can add desirable additional frequency content and phase randomization to the bandwidth spectrum, as described above, but it also depletes the low frequency content of the bandwidth spectrum, which is not desirable.

In this multiple pass looped second stage power amplifier 40" configuration of FIG. 4, a free space configuration is illustrated, which has the advantage of minimizing losses within the looped amplifier so as to increase output pulse 80 energy. While losses associated with a fiber-pigtailed modulator and a non-fiber matched WDM pump light coupler may be acceptable in the optical ring circuit, such losses are less tolerable in the final power amplification stage. Therefore, the modulator M3 151 in the power amplifier loop of this FIG. 4 embodiment is shown configured as a free space 4-port device. The amplifier loop is aligned on the first diffraction order of the modulator 151 for frequency-shifted feedback, while the zeroth order beams are used for coupling the signal from optical ring circuit 20 into the amplifier loop and coupling the amplified output beam out of the amplifier loop. This configuration is the lowest loss configuration for the modulator 151, since a reduction in diffraction efficiency equates to an increased output coupling rather than an excess loss. Due to the small angular separation of the first and zeroth diffraction orders of the available modulator 151, configuration as a fiber pigtailed 4-port device could be difficult. Alternate forms of modulators may be available to alleviate this problem, which could facilitate a fully integrated fiber embodiment of this multiple-pass power amplifier 40" configuration.

The fiber 44 carries the frequency comb signal generated in the optical ring circuit 20 to the modulator switch 151. A signal fiber port (SFP) with collimating lens 153 terminates the fiber 44 and sends the signal in free space to a miniature right angle prism 154, which is used to direct the signal into the modulator switch 151 on its zeroth order diffraction port, as indicated at 161. When the modulator 151 is turned on, a fraction of the signal light undergoes a frequency shift as it is diffracted by acoustic waves in the modulator 151, as was described for the modulator switch M1 25 above, to the output port 163. The remaining fraction of signal light is transmitted witout undergoing a frequency shift from port 162 of modulator switch 151. The signal is directed from port 162 to a narrow band filter 152 and then through a SFP and lens 156 into the power amplifier fiber 46. The fiber amplifier 46 is preferably an erbium-doped fiber amplifier (EDFA) with a low numerical aperture (NA) and large core to reduce amplified spontaneous emission (ASE) depletion of stored energy between signal pulses and to increase the number of ions in the fiber core region for energy storage, as described above. The narrow band filter 152 is used to spectrally discriminate against ASE build-up in the amplifier, i.e., to block light frequencies outside the narrow band range, which is set to pass the bandwidth of the signal. For example, a 1.5 $\mu$m narrowband tunable etalon, such as a Burleigh TL-15 (trademark) manufactured by Burleigh Instruments, Inc., of Fishers, N.Y., with enhanced transmission (>80%) can be used for this ASE discrimination filtering component 152.

The pump power for the EDFA2 46 from pump light source 110 via fiber 118 is coupled into the amplifier fiber 46 through a fiber port (SFP) with a lens 158 using a dichroic mirror 157 to minimize signal and pump power loss. The dichroic mirror 157 transmits the shorter wavelength ($\approx$980 nm) pump light, as indicated at 159, for counter-propagation into the amplifier fiber 46, but it reflects the longer wavelength ($\approx$1532 nm) amplified signal from the amplifier fiber 46, as indicated at 160, into the modulator switch 151. It is preferred that the fiberport and lens 158 be adjusted for optimum signal coupling. Therefore, additional mode matching for the pump light is provided by a lens 164 in combination with the lens 158.

The main function of the modulator switch M3 151 in this configuration is to prevent laser oscillation in the power amplifier loop comprising the EDFA2 46 until the signal input from the optical ring circuit 20 is present, after which time the energy stored in EDFA2 46 can be extracted by the signal rather than by ASE build-up. Therefore, the switching of modulator switch M3 151 in the second stage amplifier 40" is synchronized with the modulator switch M2 26 of the optical ring circuit 20 so that the finesse (Q) of the power amplifier loop EDFA2 46 is spoiled until an input signal from optical ring circuit 20 is present to extract the energy stored in EDFA2 46. When the modulator switch M2 24 and the modulator switch M3 151 are opened to transmit the signal produced in the optical ring circuit 20 into the power EDFA2 46, the loop finesse is restored, and both the signal and the ASE compete for stored energy in the EDFA2 46 during pulse build-up. Without the spectral discrimination of the narrowband filter 152, described above, the higher power ASE component of the light in the loop would dominate and extract the stored energy as a broadband Q-switched pulse that would be incoherent with the seed signal component. The ASE power input to the EDFA2 46 on each pass through the loop must therefore be reduced to a small fraction of the input signal power for the efficient amplification of the frequency comb waveform of the ladar signal. The narrow band filter or etalon 152 is used to achieve this discrimination against the broad spectrum of the ASE. For example, for ASE having a main peak about 7 nm wide, the narrowband filter or etalon 152 transmission may be set at about 0.3 nm to allow efficient energy extraction by the signal waveform. While the etalon 152 for prototype purposes has been designed as a scanning interferometer using three simultaneously driven piezo-electric stacks, this kind of set-up is subject to drift, which results in reduced signal amplification and is not ideal for ASE filtering at a fixed wavelength as required in this application. While small adjustments in the piezo-electric drive voltage can retune the etalon or filter 152 to the master oscillator 13 wavelength, it may be preferable to eliminate such drift by actively locking the peak transmission of the etalon or filter 152 to the master oscillator 13 wavelength, for example, by using a peak signal detector/dither configuration, which is well within the knowledge and capabilities of persons skilled in the art.

As mentioned above, the low NA and large core EDFA2 46 is required to reduce laser gain, hence ASE build-up, in order to minimize ASE depletion of the energy stored in the EDFA2 46 between signal pulses. To compensate for the low gain in this kind of fiber amplifier 46, it may be desirable for a low energy input pulse signal from the optical ring circuit 20 to undergo multiple passes through the EDFA2 46 in order to extract the stored energy efficiently. Hence, the power amplifier 46 loop in this second stage amplifier embodiment 40" is configured as a loop with round-trip gain greater than one when the modulator switch M3 151 is activated. As also mentioned above, the modulator switch M3 151 in this configuration causes a frequency shift in the signal for each pass around the loop. Therefore, it may be beneficial to operate the modulator switch M3 151 at a different frequency than the modulator switch M1 25 in the optical ring circuit 20 to aid in filling-in of the waveform spectral distribution, which, as described above, can further reduce satellite features in the ladar range autocorrelation function of the return ladar signal 84 and thus reduce range ambiguity. For example, while the AMTIR modulator M1 25 operates at about 22 MHz, the AMTIR modulator switch M3 151 may operate beneficially for this purpose at about 27 MHz.

The operating wavelength for this fiber ladar system 10 is preferably near the peak of the erbium gain profile at 1532 nm, although other wavelengths are feasible as well. Atmospheric transmission of radiation is stronger at about 1550 nm, but a balance has to be made between emitted pulse energy versus pulse energy extinction over extended distance in the atmosphere. At longer ranges, it becomes increasingly beneficial to operate in the atmospheric transmission window at longer wavelengths. In the region of 1532 nm, closer to the peak of the erbium gain profile, there is considerable structure in the atmospheric molecular absorption profile, offering some advantage in tuning the ladar over several nanometers.

To suppress lasing in the power amplifier 46, it is necessary to prevent complete restoration of amplifier gain between pulses, which can be done by keeping the pulse repetition frequency switched out by the modulator switch M2 24 to at least 1 kHz. However, it is believed that significant improvement in system efficiency can still be made by introducing polarization maintaining (PM) fiber to the power amplifier stage and by making the modulator switch M3 an all-fiber component, as illustrated by component 251 in FIG. 26, to eliminate fiber coupling losses.

Figure 15:
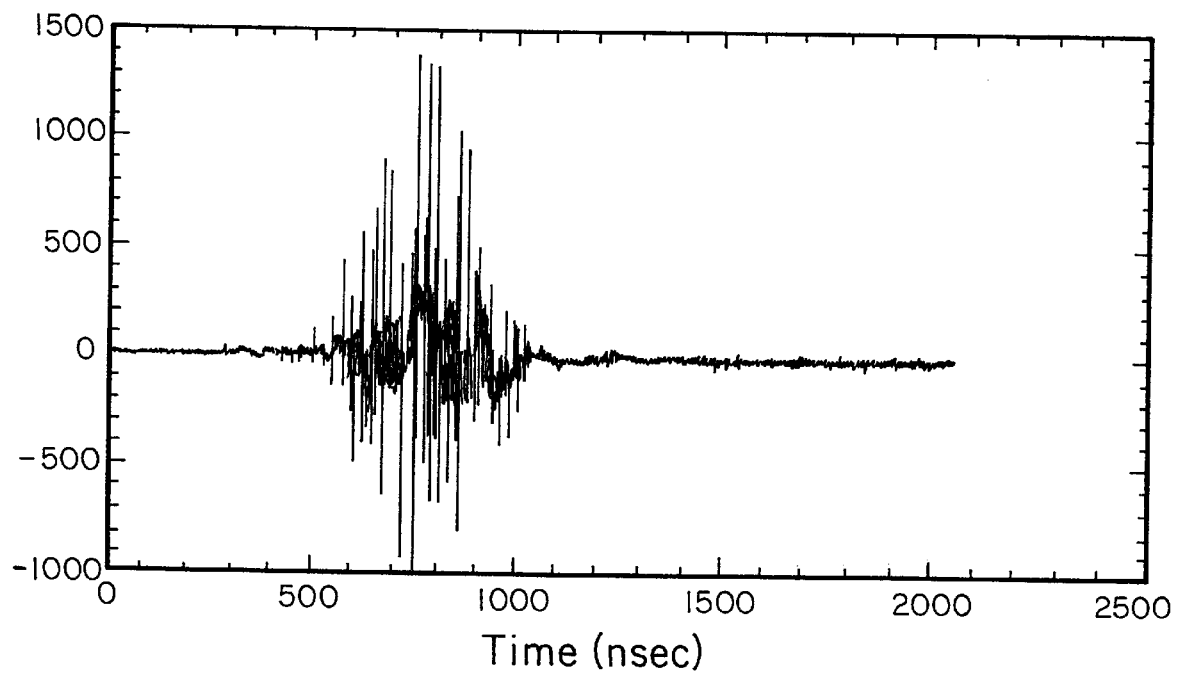
FIG. 15 is an exemplary temporal profile of a pulse produced by the multiple-pass second stage amplifier embodiment of this invention illustrated in FIG. 4 as monitored according to this invention during pulse beam transmission.
Figure 16:
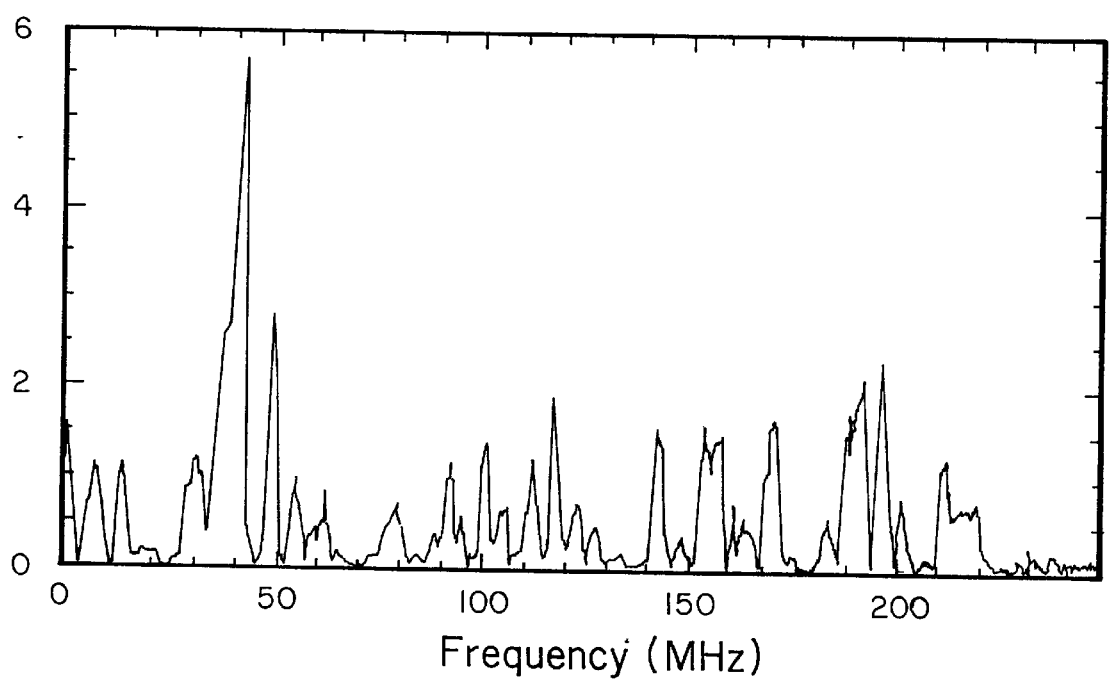
FIG. 16 is an exemplary frequency spectrum of the transmitted pulse beam illustrated in FIG. 15.

An example temporal waveform of the ladar beam 80 emitted from the transceiver 60 of the ladar system 10 with the multi-pass power amplifier embodiment 40" of FIG. 4 is illustrated in FIG. 15. A fast Fourier transform (FFT) of the temporal waveform in FIG. 15 is shown in FIG. 16 to illustrate an example wideband waveform spectrum produced by a ladar system 10 according to this invention. The example waveform illustrated in FIGS. 15 and 16 contains a large amount of frequency structure or content associated with the wide bandwidth frequency spectrum generated in the optical ring circuit 20 as well as some additional frequency components added to the emitted waveform spectrum by the frequency-shifted feedback from the modulator switch M3 151 in the second stage amplifier 40". The spectrum in FIG. 16 is reasonably well-filled with the largest frequency component near 40 MHz. As mentioned above and as will be described in more detail below, the waveform for each pulse is monitored during transmission on a single shot basis for matched-filter detection of the return signal 84, taking into account the variation in phase relationship between frequency components. Therefore, it is not necessary to fix the phases between the frequency components in the waveform, and the high-frequency structure and associated phases may vary from pulse to pulse.

Referring again to FIGS. 1–4, when the modulator switch M3 150 (151 in the FIG. 4 embodiment) is gated open to transmit the pulse 80 containing the amplified signal to the target T, the pulse or beam, which is polarized in a direction 17 (perpendicular to the paper) in fiber 43, is coupled out of fiber 43 through a signal fiber port (SFP) with a collimating lens 62 and then directed through the polarizing beam splitter (PS2) 180. The polarizing beam splitter 180 is set up to transmit light polarized in the plane 17 and to reflect light polarized in the plane 15. However, as noted above, there is substantial back scatter of light from this beam splitter 180 as well as from other optical components in the telescope apparatus 60 to result in a portion of the energy of amplified transmission signal being diverted and propagated via fiber 63 to the sensor circuit 100, while the main portion of the amplified beam signal is propagated through the telescope lens system 64 to form the transmitted outgoing beam 80. Therefore, as described above, the outgoing beam 80 to the target T and the back scatter beam portion propagated simultaneously via fiber 63 to the sensor circuit 100 carry the same waveform frequency profile, which is the basis for monitoring the waveform spectrum of each pulse as it is transmitted. This monitored waveform of the transmitted signal is detected, stored, and used for subsequent matched-filter detection of the return beam 84. This frequency profile or "fingerprint" of the pulse transmitted in beam 80 that is captured in the back scatter portion of the beam and carried by fiber 63 to the sensor circuit 100 is first mixed with the local oscillator signal in coupler 90 for heterodyne beat detection in the sensor circuit 100. The monitored waveform, being coherently detected and sampled by the waveform monitor 102, which is a heterodyne detector that produces an electric signal indicative of the temporal profile of the monitored waveform, as illustrated in FIG. 15, is digitized by an analog to digital (A/D) converter in a digitizer circuit 206 and stored in the signal processing circuit 220 for use in the matched filter detection when the return or echo beam 84 is received. Since the strength of this back scatter monitor signal is typically very much larger than the strength of the reflected signal 84 from the target T, a heterodyne detector 104 that is set up to be sensitive enough to detect Doppler frequency shifts in the reflected signal 84 could be swamped or saturated by the much stronger back scatter monitor signal, thus not useable. Therefore, in the preferred embodiment of this invention, one heterodyne device, denoted as the waveform monitor 102, is set up to handle larger amplitude back scatter monitor signals, while another heterodyne detector 104 is set up to detect the much weaker return signal 84 when it is received. To accommodate the waveform monitor 102 and heterodyne detector 104, the mixed signal in fiber 101 from coupler 90 is passed through another coupler 103, which transmits most of the energy in the mixed signal to the heterodyne detector 104 while passing only a very small proportion of the energy to the waveform monitor 102. In the preferred embodiment, this ratio of energy division to the heterodyne 104 and waveform monitor 102, respectively, can be in the range of 90:10 to 99:1, and preferably about 98:2. Therefore, when the larger amplitude back scatter monitor signal is being monitored for the transmitted frequency profile, most of the energy is diverted by coupler 103 away from the waveform monitor 102 so that the heterodyne detector components of the waveform monitor 102 are not saturated. The heterodyne beat signals of the monitored back scatter from the transmitted pulse 80 can be detected by the waveform monitor 102 at that lower energy level. However, when the much weaker reflected beam 84 is received, the heterodyne beat signals are detected by the heterodyne detector 102, which receives most of the light energy from the coupler 103. The much stronger back scatter monitor signal of the transmitted pulse 80, most of which is diverted by coupler 103 away from waveform monitor 102 and into heterodyne detector 104, will usually saturate the heterodyne detector 104, rendering its electrical ouput signal useless at that time. However, this result is harmless, since the waveform monitor 102 detects the beat frequencies of the monitored back scatter from transmitted pulse 80, as described above, and the heterodyne detector 104 recovers from such saturation before the return signal 84 is received. Therefore, detection of the return signal 80 by heterodyne detector 104 is not impeded. Heterodyne circuits that can provide the functions of the waveform monitor 102 and return signal sensor 104 are well-known in the art, thus are not described in detail here. Suffice it to say that a photo-sensitive device, such as a photovoltaic cell, photodiode, or other component that transduces light energy to electrical signals are used in combination with appropriate amplifiers and filters to convert the mixed light energy to detectable and useable electric signals that are indicative of the light waveforms. An extended wavelength photodiode, such as an InGaAs photodiode manufactured by Sensors Unlimited of Princeton, N.J., having a 75 $\mu$m active area, may be used for such heterodyne functions required by this invention.

It is possible, of course, to design an alternate detector circuit that uses just one rather than two heterodyne photodetectors. Such a single detector circuit can have several advantages. For example, it may reduce the complexity of the ladar system 10, and it can provide an identical spectral response for comparison of monitor and return signal profiles for the matched-filter detection. However, such a single detector configuration would require low back scatter of the monitored transmitted beam pulse from the telescope 170 so that both the monitored waveforms and the return signals from the target T fall within the dynamic range of the detector.

Figure 18:
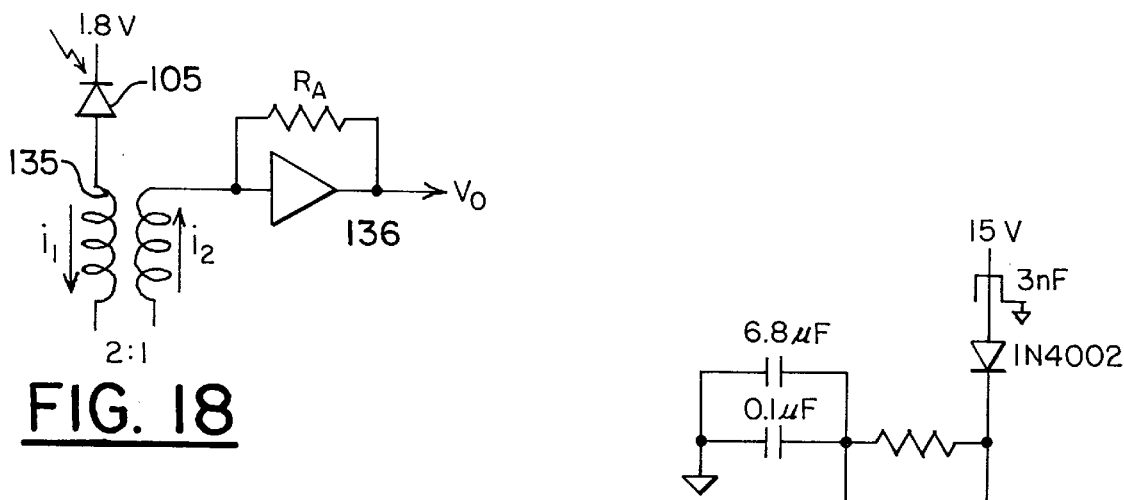
FIG. 18 is a functional schematic diagram of a heterodyne circuit that can handle detection and preamplification of both the monitored transmitted waveform as well as the return signal from the target.
Figure 19:
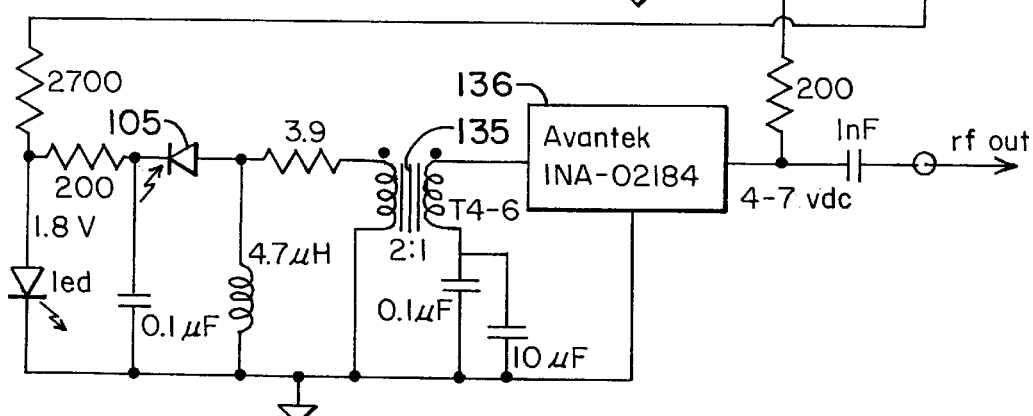
FIG. 19 is a schematic diagram of an exemplary electric circuit that can perform the functions illustrated in FIG. 18.

A simplified example of a heterodyne detector circuit suitable for use both as the waveform monitor 102 or heterodyne detector 104 is illustrated schematically in FIG. 18. Efficient coherent detection requires a detector/preamplifier ciruit that allows shot-noise-limited operation and near-flat frequency response over the detection bandwidth. The photodiode 105 converts the incident light to an analog electric signal or photocurrent. This photocurrent is AC coupled by a high bandwidth transformer 135 to a high bandwidth amplifier 136, such as a part no. INA-02184, manufactured by Aventek Inc., of Santa Clara, Calif. Use of the transformer 135 coupling has the advantage that it does not pass DC current, and the lack of a large DC current on the transformer allows for large photocurrents without saturating the amplifier 136. Therefore, the photocurrent and associated shot noise is limited by the photodiode 105 and local oscillator power capability, not by the amplifier 136. Therefore, it can better handle the high energy back scatter monitor signal during transmission of the pulse beam 80 as well as the much weaker return signal 84. It also has the advantage that the current fluctuations (shot noise) are amplified by the primary-to-secondary turns ratio of the transformer 135. The output voltage $V_0$ is the resulting heterodyned rf signal that is indicative of the detected waveform. An actual example of a suitable heterodyne detector circuit from either waveform monitor 102 or heterodyne detector 104 or for use as a single heterodyne detector configuration, as discussed above, is shown schematically in FIG. 19.

Figure 17:
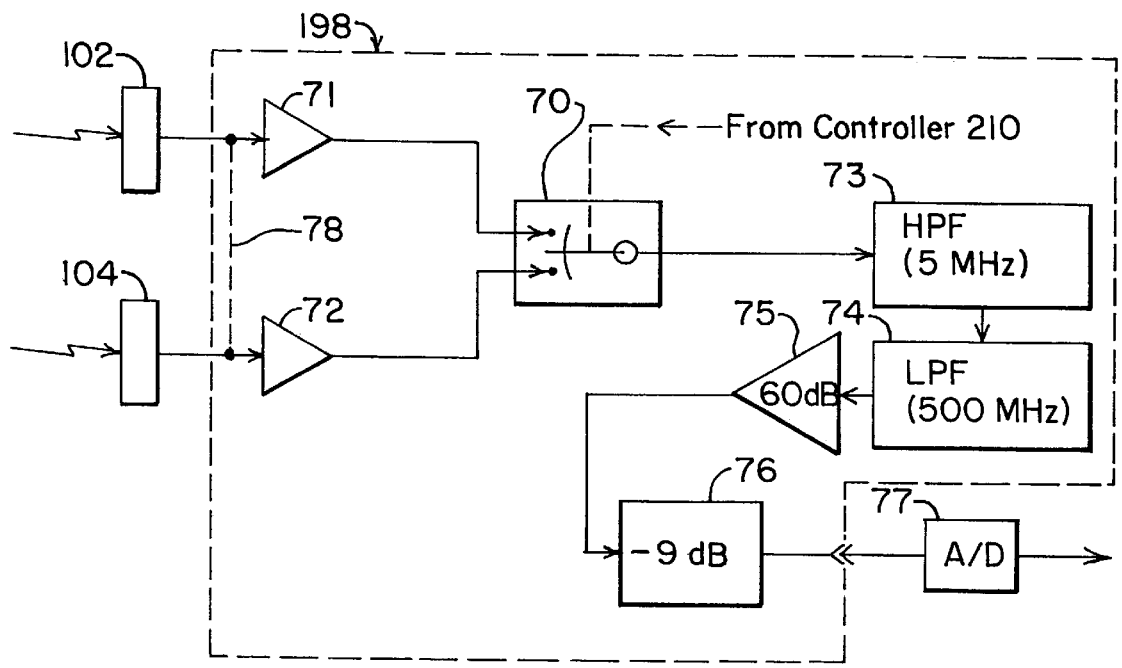
FIG. 17 is a schematic function block diagram of the preamplification, rf switching, signal filtering, and analog-to-digital conversion stages of the signals output from the transmitted pulse monitor and return signal heterodyne components used in this invention.

The analog signal conditioning circuit 198 can include a switch function controlled by controller processor 210 (FIG. 1) to switch between the respective waveform monitor 102 and heterodyne detector 104 at the appropriate times as the respective back scatter monitor signals and return echo signals are being detected by the respective waveform monitor 102 and heterodyne detector 104, as described above. For example, as illustrated schematically in FIG. 17, the signal conditioning circuit 198 receives analog electrical signals from both the waveform monitor 102 and heterodyne detector 104, which essentially comprise photodiodes or other photo detectors that convert light energy to electric signals, as described above. Therefore, the waveform monitor 102 and heterodyne detector 104 produce analog electric signals, preferably in the radio frequency (rf) range for ease of signal processing, that are indicative of the incident light waveforms. An rf switch 70 is used to time multiplex the electrical signals from the two heterodyne photoreceivers 102, 104 into a single channel for the signal processing circuit 220. The rf switch 70 is controlled by the controller processor 210 to connect the waveform monitor 102 to the electrical signal conditioning components 73, 74, 75, and 76, while the modulator switch M3 150 (151 in the FIG. 4 embodiment) is open to transmit a pulse beam 80 so that the electrical signal produced by the waveform of the transmitted pulse beam 80 in the waveform monitor 102 is routed through the electrical signal conditioning components 73, 74, 75, and 76 to the analog-to-digital converter 77. At the same time, any electrical signal produced by the heterodyne detector 104 from the back scatter of the transmitted pulse beam 80, which, as mentioned above, could be from a saturated heterodyne detector 104, is switched out or blocked by the rf switch 70. Then, the rf switch 70 is toggled to connect the heterodyne detector 104 to the elctrical signal conditioning components 73, 74, 75, and 76 and analog-to-digital converter 77, which is the principal component of the digitizer circuit 206 (FIG. 1), when the return echo signal 84 is received. The time of flight of the waveform to and from the target T, usually about 5 to 10 $\mu$sec or more, depending on target range, provides ample time for switching of the rf switch 70 to occur without aliasing either the monitor signal or the return signal. Adjusting the amount of electrical gain in the electric signals from the waveform monitor 102 and heterodyne detector 104 with preamplifiers 71, 72, respectively, ensures that both the monitor and return signals are at an appropriate level for signal processing. A high pass filter 73, for example 5 MHz, can be used to eliminate low frequency noise associated with relaxation oscillations in the master oscillator 13. A low pass filter 74, for example 500 MHz, is used to impose an upper limit on the detector bandwidth. A combination of wideband amplifiers 75 and attenuators 76 can be used to ensure that the dark noise floor dominates the signal processor noise floor. The analog signal is then fed to the digitizer circuit (FIG. 1) where an analog-to-digital (A/D) converter 77 (FIG. 17) to convert the signal to digital form for signal processing. Such electronic switching circuits and digitizer components and circuits are well within the capabilities of persons skilled in the art and need not be described in more detail for purposes of this invention. For a single heterodyne detector configuration as discussed above, one or the other of the heterodyne detectors 102, 104 could be replaced by the electrical connection 78 shown in phantom lines in FIG. 17.

As mentioned above, the coupler V1 90 provides a convenient way to mix the back scatter monitor signal from the transmitted pulse beam 80 as well as the return echo signal 84 with a local oscillator (LO) signal provided by the master oscillator 13 for heterodyne detection. This configuration, where coupler V1 90 is used both to mix and pass light to the heterodyne detectors 102, 104 while at the same time controlling the amount of light routed to the optical ring circuit 20 for seeding purposes, as described above, is analogous to a configuration that is often used in coherent lidar systems where a bulk optical splitter provides local oscillator light to mix with a signal to be detected as well as routing light from a master oscillator to a transmitter. This configuration works best by ensuring that a small fraction of the available MO power (LO signal) is sufficient to achieve shot-noise limited operation of the heterodyne detector. The splitter then transmits most of the MO power to the optical ring circuit 20 for seeding. At the same time the coupler V1 90 transmits most of the back scatter monitor signal or most of the return signal, whichever is present at the coupler V1 90 at a given time, toward the detectors 102, 104, where it mixes with the LO signal, while only a small fraction is lost in the direction of the optical ring circuit 20. The variable capability of the coupler V1 90 provides the ability to adjust this distribution, but such couplers could be subject to some power loss. Therefore, a fixed ratio coupler may be preferable.

The outgoing beam 80, as best seen in FIGS. 2, 3, and 4 is passed through a ¼-wave retarder 66, which converts the output beam 80 from a planar polarized beam in the plane 17 to a circularly polarized beam, as indicated by arrow 82. Upon striking the target T and being reflected thereby, the circular polarization of the reflected beam 84 is still circular polarized, but reversed in direction or "handedness" with respect to the direction of light propagation. For example, a beam circularly polarized in the right-handed direction with respect to the propagation of the transmitted beam 80 will be circularly polarized in the left-handed direction with respect to the propagation of the return or echo signal 84. Therefore, as the reflected beam 84 is received and propagated back through the ¼-wave retarder 66, the emerging beam is planar polarized again, but in the direction 15 instead of the direction 17. In other words, the plane of polarization 15 of the received light 84 after passing through the ¼-wave plate 66 is rotated 90 degrees from the plane of polarization 17 of the pulse beam produced by the secondary stage power amplifier 40, 40', or 40". Consequently, when the return signal 84 reaches the polarizing beam splitter 180, it is reflected rather than transmitted. This reflected beam is then specularly reflected by mirror 67 and enters fiber 63 through signal fiber port (SFP) and lens 68. The fiber 63, which is also a polarization maintaining fiber, is twisted 90 degrees, as indicated by arrow 69, to deliver the signal to coupler 90 with the plane of polarization in the direction 17 for efficient optical mixing with the local oscillator signal in the detector circuit 100 for heterodyne detection, as described above.

The output beam is mode-matched to the ladar transceiver 170 using a signal telescope or beam expander 64. It is most efficient optically to position the signal telescope 64 in front of the quarter-wave plate 66, as shown in FIGS. 2–4. However, the aperture after the signal telescope 64, requires a large, thus expensive, quarter wave plate 66. Therefore, it may be more economical to reverse the order of signal telescope 64 and quarter wave plate 66.

The return signal 84, upon reception in the telescope 170 and heterodyning with the local oscillator (LO) signal in heterodyne detector 104, as described above, is matched-filter processed to derive range and velocity information. Essentially, the monitored waveform of the transmitted beam 80, which has been detected by waveform monitor 102 and stored, as described above, is used as a base template from which matched-filters are created for cross-correlation with the waveform of the return echo signal 84 detected by heterodyne detector 104. More specifically, a sequence of hypothesized velocities of the target T are tried in the matched-filter or cross-correlation process until the best match is found for the waveform of the detected return signal 84. Upon finding a match with a waveform produced by using a particular hypothesized velocity, the hypothesized target velocity is, of course, the actual target T velocity, and the match-filter output provides the time of flight of the pulse beam to and from the target T, from which range is determined.

Figure 20:
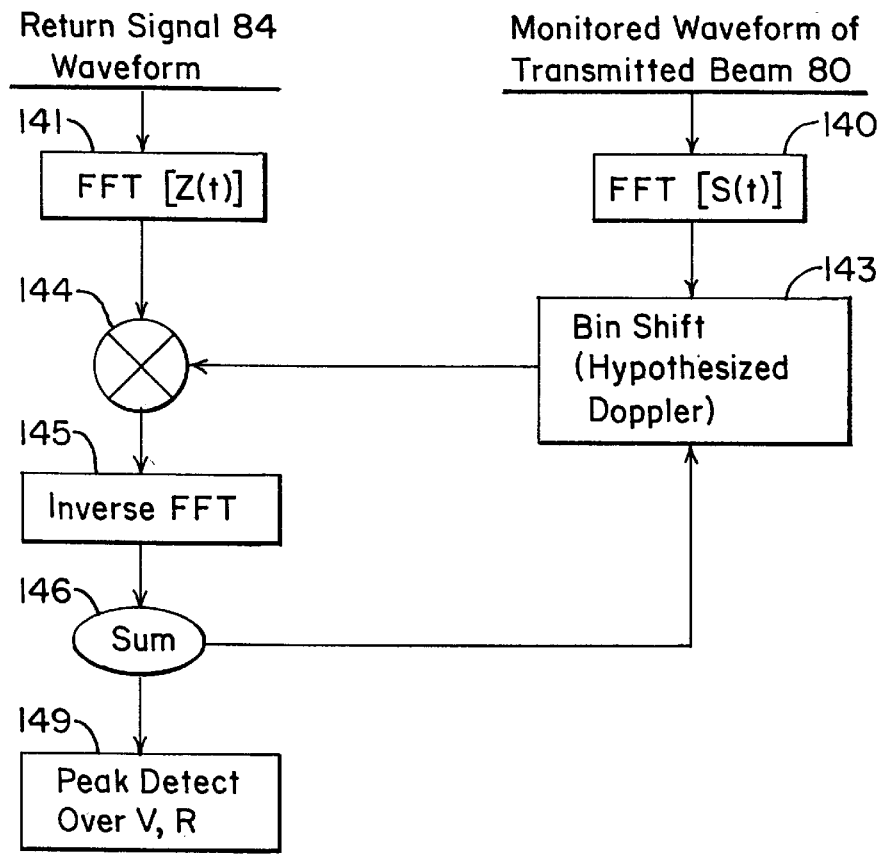
FIG. 20 is function block flow diagram of a matched-filter algorithm that can be used with the monitored transmitted waveform to detect Doppler frequency shift and time of flight from the return signal from the target.

Referring now to FIG. 20 in combination with FIGS. 1–4 and 17, a function block flow diagram illustrates the cross-correlation algorithm used in the matched-filter signal process of this ladar system 10. As mentioned above, a small portion of the transmitted waveform s(t) is split from the transmitted beam pulse 80, coherently detected, sampled, and stored. The temporal waveform shown in FIG. 15 is an example of the monitored portion of the transmitted waveform. Prior to storage, a fast Fourier transform function is performed on the waveform at step 140 in FIG. 20 to obtain the bandwidth frequency spectrum of the waveform s(t). An example of the frequency spectrum of the transmitted waveform s(t) is shown graphically in FIG. 16. This frequency spectrum waveform s(t) is stored, preferably in digital form.

Figure 21:
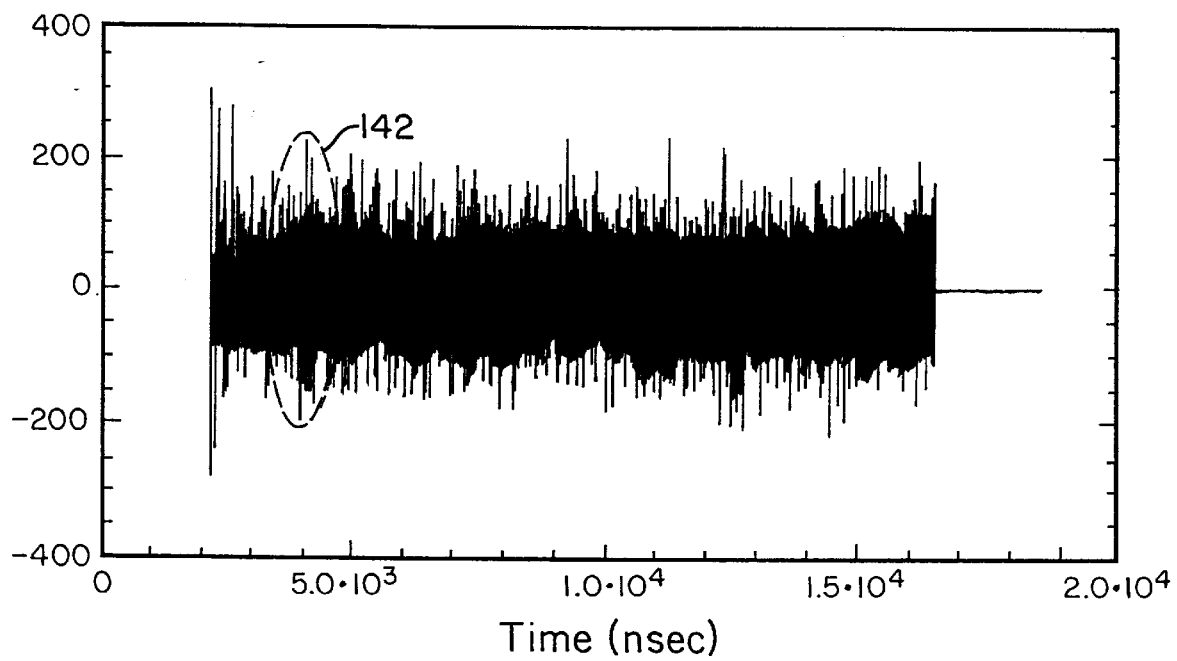
FIG. 21 shows an exemplary temporal profile of a return signal detected after the transmitted beam pulse illustrated in FIG. 15 is reflected by a target.

An example of the temporal profile of a detected return beam pulse 84 is shown in FIG. 21. The target return is weakly visible in FIG. 21, as outlined at 142, in the vicinity of the 4 μsec time index. When the return signal 84 is detected, it is also digitized, as described above, and undergoes a fast Fourier transform (FFT) function at step 141 in FIG. 20. The bin shift function 143 is programmed to modify the monitored waveform FFT[s(t)] mathematically, effectively introducing a phase shift that corresponds to a hypothesized target velocity, which is then used as the matched-filter for the first auto-correlation attempt with a fast Fourier transform of the return signal waveform FFT[z(t)]. The hypothesized monitored waveform FFT[s(t)] is multiplied by the return signal waveform FFT[z(t)] at step 144 in FIG. 20, and the product undergoes an inverse fast Fourier transform (FFT) step 145. The bin shift function 143 then increments to provide a new matched-filter waveform FFT[s(t)] phase shifted mathematically from the previous waveform FFT[s(t)] to correspond to an incrementally increased (or decreased) hypothetical velocity. This new incremental waveform FFT[s(t)] is then used as the matched-filter for autocorrellation by multiplication at step 144 with the return signal waveform FFT[z(t)], and the new product undergoes reverse FFT at step 145. The result can preferably, but not necessarily, be summed at step 146 over multiple pulses to improve signal detection. This process is repeated multiple times with the bin shift 143 providing sequential increments of matched-filters representing increased (or decreased) hypothetical velocities until a match with the return signal waveform is found. Since the monitor waveform was sampled from the same transmitted pulse that is ultimately reflected from the target T and detected as the return signal waveform, as described above, the return signal waveform has the same frequency content as the sampled monitor signal, except for the Doppler frequency shift caused by the velocity of the target T in relation to the ladar system 10. The Doppler shift affects all of the frequency components of the waveform. Therefore, by basing the matched-filters on the monitored waveform signal, e.g. that shown in FIG. 16, and mathematically adjusting them with frequency or phase shifts comparable to hypothesized target T velocities in cross-correllation, as described above, a match can be found with a hypothesized velocity that equals the actual velocity of the target T, which is manifested by a pronounced peak in the matched-filter output. It is preferred, for best Doppler resolution, to use small phase or velocity increments in preparing the successive matched filters, because different pixels have unknown velocities. However, too many iterations could overtax available computing capability and time. Therefore, some judgment in selecting increment sizes will have to be made on expectations of the type of target T being imaged considering the computing and time limits in the system.

Figure 22:
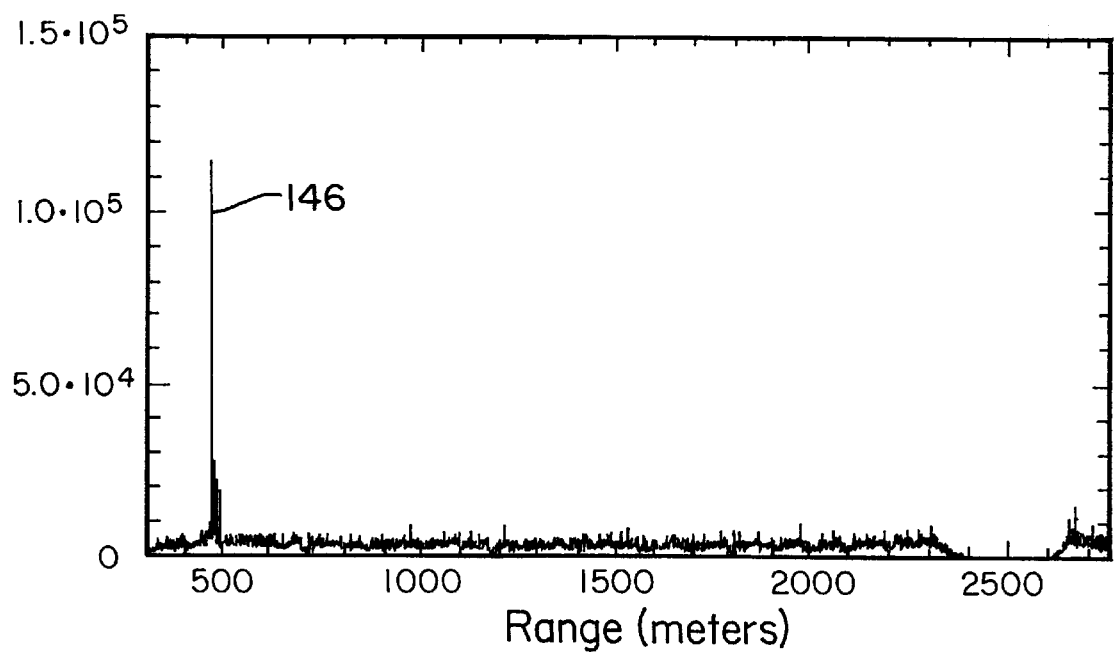
FIG. 22 shows an exemplary illustration of the matched-filter output from the return signal of FIG. 21 using the transmitted waveform in FIG. 16 as the basis for the matched-filter.
Figure 23:
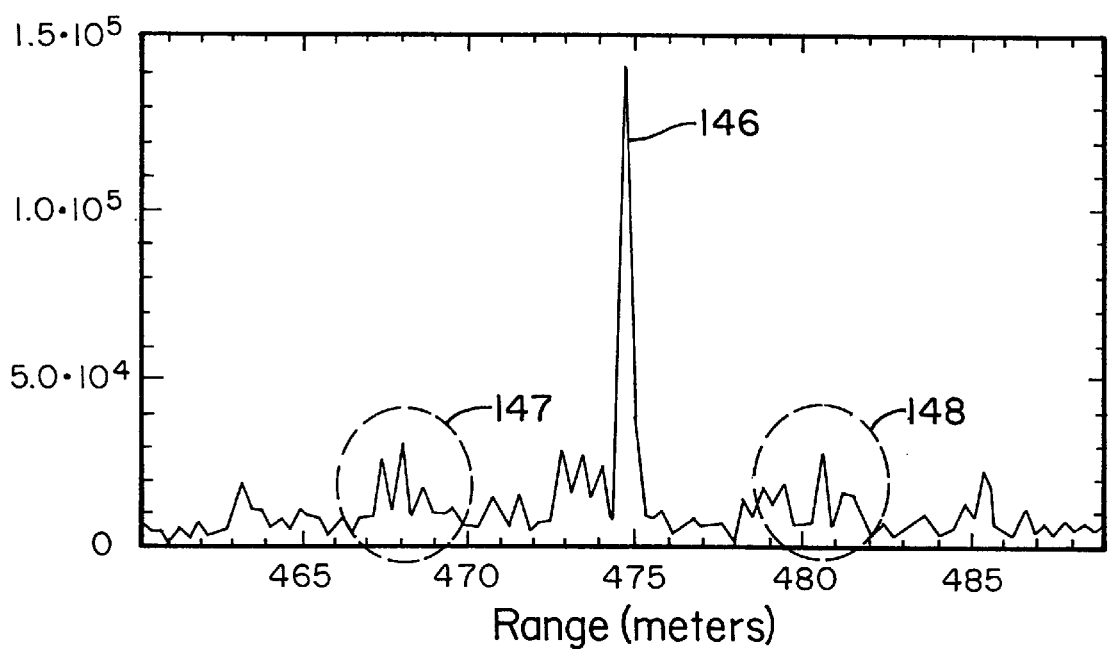
FIG. 23 shows the matched-filter output of FIG. 22 expanded in the region of the peak return for closer inspection of the range of that target indicated by the peak return.

The matched-filter output of the return signal illustrated in FIG. 21 cross-correlated with a matching, hypothetical velocity adjusted, waveform from the monitor waveform of FIGS. 15 and 16, after accumulation of ten pulses in the summing step 146 of FIG. 20, is shown in FIG. 22. The peak return 146 is apparent as a very prominent spike in FIG. 22, which is expanded in FIG. 23 in the region of the peak return 146. As best seen in FIG. 23, the peak return 146 occurs just below 475 m. The range ambiguities in FIG. 23, the closest 147, 148 of which are fairly benign, occur at approximately 11 m from the peak 146. This kind of very satisfactory and acceptable result is obtainable because of the full frequency content provided by the optical ring circuit 20 and to some extent power amplifier 40, 40', 40" of the ladar system 10 according to this invention. The range, as explained above, is a function of the time of flight of the pulse beam to and from the target T, which is closely monitored by the controller processor 210. Therefore, when a match is found between the monitored waveform and the return signal 84 waveform, the time of flight is known very precisely. Essentially, the time of flight is illustrated in FIG. 21, which is translated into the range in FIGS. 22 and 23. The velocity and range detection is the last step 149 shown in the algorithm of FIG. 20 and involves peak detection of the inverse FFT for the varying hypothesized Doppler shifts to determine the maximum likelihood pair of values for range and line of sight velocity.

Figure 24:
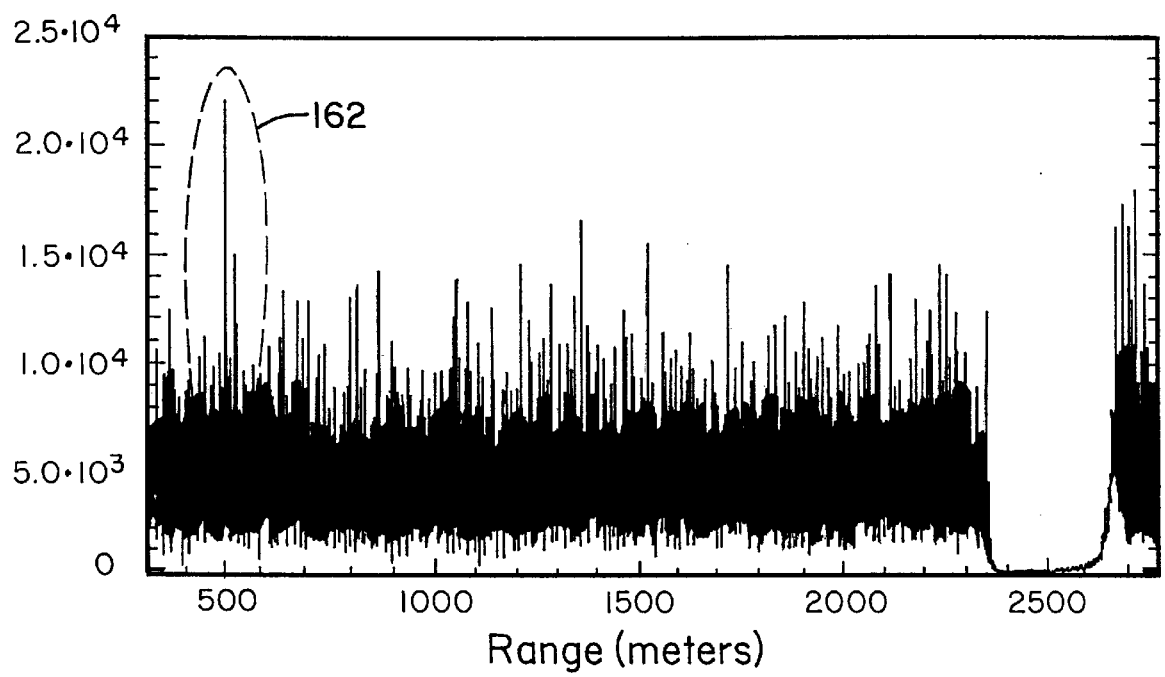
FIG. 24 shows an exemplary matched-filter response for a pair of targets separated in range by roughly 1 m and illuminated simultaneously by the ladar system of this invention.
Figure 25:
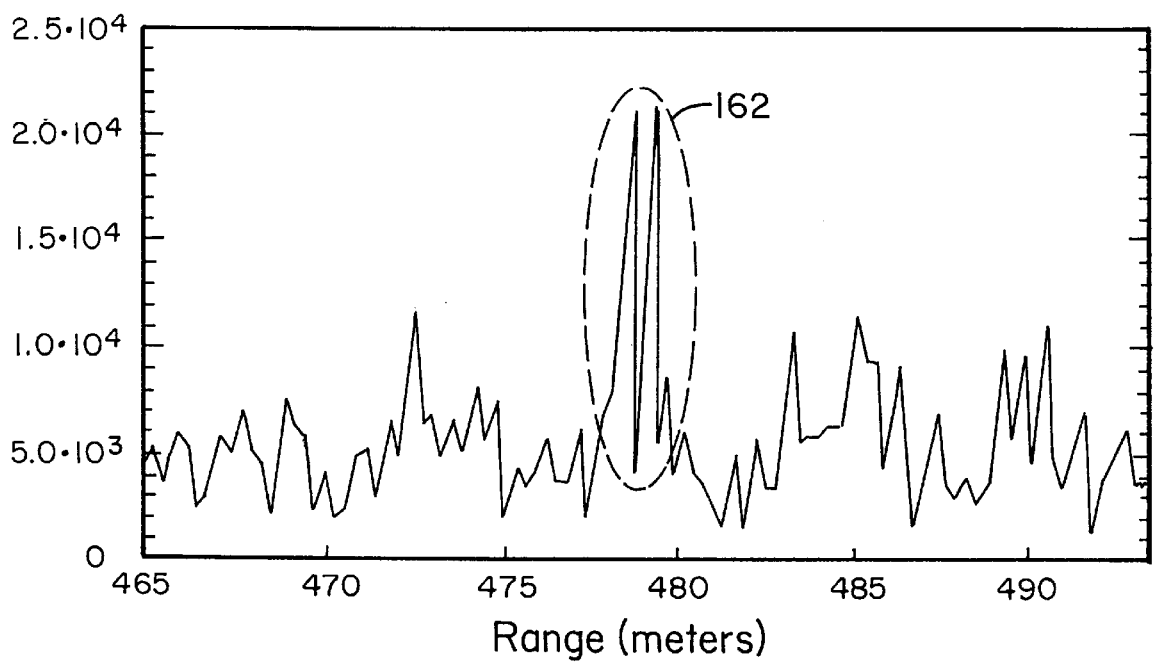
FIG. 25 shows the matched-filter output of FIG. 24 expanded in the region of the peak returns for closer inspection of the range resolution between the two targets indicated by the peak returns to illustrate the greatly enhanced reduction in range Doppler ambiguity, thus multiple target object detection capabilities of this invention.

An example matched-filter response for a pair of targets separated in range by about 1 m and illuminated simultaneously by the ladar system 10 is shown in FIGS. 24 and 25. As shown in FIG. 24, such simultaneous illumination can be achieved by allowing the closer target to capture only a portion, such as half, of the incident radiation and placing the second target immediately behind and slightly offset from the first target such that it captures the remaining radiation. The peaks of the two responses, outlined at 162 in FIGS. 24 and 25, are separated by 0.6 m, which, because of digitizer quantization effects, is somewhat less than the actual 0.9 m, but it illustrates the principle.

The matched-filter processing does not have to be in the frequency domain by fast Fourier transforms (FFT), but, as is well-known in the art, such processing in the frequency domain is much more efficient than in the time domain.

Figure 26:
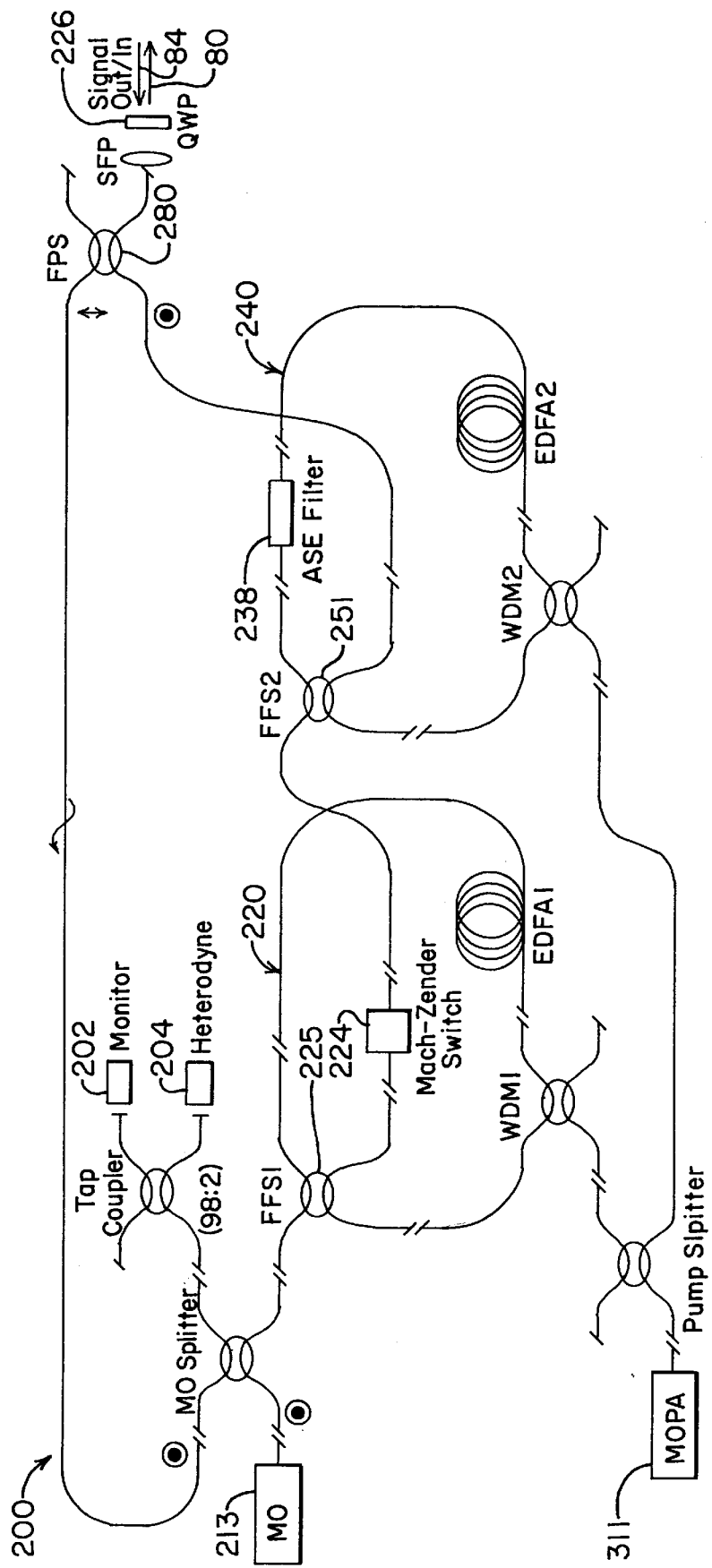
FIG. 26 is a diagrammatic view of an all-fiber components embodiment of the ladar system of this invention.

An all-fiber alternate embodiment 200 of the ladar system of this invention is shown schematically in FIG. 26. The all-fiber construction of this embodiment 200 is to reduce losses, to increase pulse energy capability, and to provide a robust system, but it depends on availability of all-fiber components that can perform the needed functions efficiently. Fixed ratio fused couplers, such as those available from 3M Specialty Optical Fibers, of West Haven, Conn., are preferred and would be fusion-spliced together to form distinct modules, such as the optical ring loop 220 and power amplifier 240. The master oscillator 213 may be a single frequency distributed Bragg reflector (DBR) laser diode or an Yb, Er doped fiber laser. The frequency shifters 225, 251 may be fiber frequency shifters (FFS), such as those developed by Optoelectronics Research Center, U.K., configured as 4-port devices. A fiber-pigtailed Mach-Zender amplitude modulator 224 based on $LiNBO_3$ integrated-optic waveguide technology may be used to switch out the pulses without introducing additional frequency shift. An optimum transmission filter 238 for ASE protection by combining multiple gratings with different center reflectivity wavelengths is not yet available. A fiber Fabry-Perot filter available from Micron Optics, Inc., of Atlanta, Ga., may be satisfactory, but would require active control of air gap. An alternate approach may be to use one or a series of miniature bulk etalons in a fiber-pigtailed package. The MOPA pump source 311 is a fiber pigtailed device. A fiber polarization splitter (FPS) 280 is used in combination with the quarter wave plate (QWP) 266 as the ladar transmit/receive switch, which allows a single signal fiber port (SFP) to be used to couple the ladar transceiver to the ladar telescope and scanner. Either separate waveform monitor 202 and heterodyne detector 204 or a single heterodyne detector can be used, as described above, depending on signal levels expected in the specific application for the fiber ladar. The all-fiber frequency shifter (FFS) 225 can stabilize the optical ring circuit for increased frequency component generation with reduced frequency spacing.

The use of a phase modulator with large phase shift and modulation period short in comparison to the primary loop transit time may be used to randomize the phase of different frequency components in the ladar waveform in order to reduce the energy in the ghost images or ambiguities of the ladar system. Another improvement may include a train of closely spaced pulses in the emitted waveform, each with a frequency spectrum shifted up in frequency from that of the previous pulse by a value equal to the detection bandwidth. In this manner, the full frequency content of the waveform would be temporarily distributed (a quasi-chirped waveform) in discrete frequency packets. The ladar receiver would down-shift these frequency packets into the receiver bandwidth by multiple passes in a similar fiber loop frequency-shifted feedback. Such extension of receiver bandwidth beyond the capability of the electronics is a significant feature of the fiber-based ladar transceiver of this invention.

The modular design of the fiber ladar and the choice to generate a comb of discrete frequency components using frequency-shifted feedback for this invention was driven in part by the limited bandwidth response of available detectors and the signal processor digitization requirements. This approach is deemed most suitable for robust waveform generation with bandwidths of several hundred megahertz, allowing range imaging with resolution on the order of 1 ft. As detector bandwidths become wider (while maintaining large dynamic ranges of 30–40 dB to accommodate varying target reflectivity) and signal processing becomes more powerful, then wider waveform bandwidths may become practical, allowing detailed angle-angle imaging with ever-increasing range resolution. For bandwidths greater than 1–2 GHz, the fiber ladar architecture of this invention may be simplified significantly, while simultaneously making the system more robust and more efficient. In such a simplified architecture, rather than using the Master Oscillator Pawn Amplifier design described above, the ladar transmitter could comprise a Q-switched fiber laser incorporating a narrowband spectral filter. The use of frequency-shifted feedback would again be employed to eliminate modal structure in the intracavity field. The resulting waveform will have a continuous spectrum with a bandwidth determined by the filter response and gain dynamics in the fiber laser. Coarse locking of the spectral filter to a local oscillator source and matched filter detection of the return signal to an outgoing monitor pulse will allow simultaneous range-Doppler imaging in much the same fashion as that described above using the discrete frequency comb.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Ladar apparatus, comprising:
   a generator of light pulses that have finite duration and temporal waveforms comprising multiple, simultaneous frequency components with varying phase relationships between the frequency components and incommensurate spectral frequency spacing;
   a transmitter positioned in the light pulses in a manner that promulgates the light pulses toward a target;
   a transmitted waveform detector positioned to receive and record a temporal waveform in the duration of a pulse that is promulgated by the transmitter;
   a received waveform detector positioned to receive and record a temporal waveform of a pulse that is reflected by the target;
   a matched-filter correlator that modifies a recorded waveform with a sequence of phase shifts that correspond to a sequence of hypothesized target velocities for matched-filters and that performs matched-filter cross-correlations between the modified waveforms and the reflected waveform until a match is found; and
   a timer that measures time elapsed between transmission of a pulse and reception of the reflected pulse that matches one of the matched-filters in the cross-correlations.

2. The apparatus of claim 1, wherein said generator includes an optical ring circuit comprising a frequency shifter and an amplifier connected together in a continuous feedback loop and a gate switch coupled into the feedback loop through which light in the feedback loop is selectively gated out of the feedback loop.

3. The apparatus of claim 2, including a laser source coupled into the feedback loop for providing a continuous wave single frequency seed light to the feedback loop.

4. The apparatus of claim 2, wherein said amplifier includes a primary stage doped fiber and a primary stage pump light source coupled into said feedback loop.

5. The apparatus of claim 4, including a power amplifier coupled to said gate switch in such a manner that light from the feedback loop in the optical ring circuit is directed into and amplified by the power amplifier.

6. The apparatus of claim 5, wherein said power amplifier includes a secondary stage doped fiber and a secondary stage pump light source coupled into said secondary stage doped fiber.

7. The apparatus of claim 6, wherein said secondary stage doped fiber has a larger doped core and smaller numerical aperture than the primary stage doped fiber.

8. The ladar apparatus of claim 1, wherein said generator of light pulses includes a Q-switched fiber laser connected in an optical loop with a narrow band spectral filter, a frequency shifting modulator, and a Q-switch.

9. The ladar apparatus of claim 1, wherein said generator of light pulses includes a source of continuous wave, single frequency light connected optically to a doped fiber amplifier in an optical loop with a frequency shifting modulator, and a light gate connected optically to the transmitter.

10. The ladar apparatus of claim 9, including a narrow band filter in said optical loop.

11. The ladar apparatus of claim 10, wherein said doped filter amplifier is a Q-switched fiber amplifier and said light switch is a Q-switch for said Q-switched fiber amplifier.

12. The ladar apparatus of claim 11, wherein said source of continuous wave, single frequency light is a seed light energy source for said Q-switched fiber amplifier.

13. The ladar apparatus of claim 9, wherein said continuous wave, single frequency light has a first frequency and said ladar apparatus also includes a second source of continuous wave, single frequency pump light of a second frequency, which is different than said first frequency, and which is connected to said doped fiber amplifier.

14. The ladar apparatus of claim 13, wherein said first frequency continuous wave light has a wavelength of about 1532 nm.

15. The ladar apparatus of claim 14, wherein said first frequency has a frequency line width of about 100 kHz.

16. The ladar apparatus of claim 15, wherein said source of said first frequency continuous wave light is a erbium laser.

17. The ladar apparatus of claim 16, wherein said source of said first frequency continuous wave light is a bulk master oscillator erbium laser having a linearly polarized light output.

18. The ladar apparatus of claim 9, wherein said source of continuous wave, single frequency light is a single frequency fiber laser.

19. The ladar apparatus of claim 9, wherein said source of continuous wave, single frequency light is a laser diode.

20. The ladar apparatus of claim 9, wherein said continuous wave, single frequency light is linearly polarized, wherein said optical loop comprises said doped fiber amplifier connected in a continuous optical ring circuit with said frequency shifted modulator by single-mode, polarization-maintaining optical fibers, said source of continuous wave, single frequency light is optically connected to said optical ring circuit by single-mode polarization-maintaining fiber coupled into said optical ring circuit.

21. The ladar apparatus of claim 20, including a pump light source connected optically to said doped fiber amplifier.

22. The ladar apparatus of claim 9, including a phase modulator in said optical loop.

23. The ladar apparatus of claim 22, wherein said phase modulator has a modulation period that is short in comparison to loop transit time of light in the optical loop.

24. The ladar apparatus of claim 9, including a secondary power amplifier connecting light signals gated out of said optical loop by said light gate to said transmitter.

25. The ladar apparatus of claim 24, wherein said secondary power amplifier includes a doped fiber amplifier pumped with light energy from a pump light source.

26. The ladar apparatus of claim 9, wherein said transmitter includes a beam splitter connected optically to said generator of light pulses, to said transmitted waveform detector, and to transmitter lense apparatus.

27. The ladar apparatus of claim 26, wherein said transmitter lense apparatus includes collimator lense apparatus.

28. The ladar apparatus of claim 26, wherein said transmitter lense apparatus includes telescope lense apparatus.

29. The ladar apparatus of claim 26, wherein said beam splitter is a polarized beam splitter and said transmitter includes a one-quarter wave retarder positioned between the beam splitter and the target.

30. The ladar apparatus of claim 26, including an optical switch positioned between said generator of light pulses and said beam splitter.

31. The ladar apparatus of claim 26, wherein said received waveform detector is connected optically to the beam splitter.

32. The ladar apparatus of claim 31, wherein both said transmitted waveform detector and said received waveform detector are provided by an electric circuit that includes a single heterodyne photo detector that is responsive to both the transmitted waveform and the received waveform to produce heterodyned signals of both the transmitted waveform and the received waveform.

33. The ladar apparatus of claim 31, wherein said transmitted waveform detector includes a first heterodyne photo detector and said received waveform detector includes a second heterodyne photo detector.

34. The ladar apparatus of claim 33, including an optical coupler connecting both said first heterodyne photo detector and said second heterodyne photo detector optically to said beam splitter in a manner that propagates less light from the beam splitter to the first heterodyne photo detector than to the second heterodyne photo detector.

35. The ladar apparatus of claim 34, wherein said optical coupler is set to propagate light to said first heterodyne photo detector and to said second heterodyne photo detector in a ratio in a range of about 90:10 to 99:1.

36. The ladar apparatus of claim 33, wherein said matched-filter correlator includes digitizer means connected to said first heterodyne photo detector and to said second heterodyne photo detector and to said second heterodyne photo detector to digitize heterodyned signals of the temporal waveform in the pulse that is transmitted and of the temporal waveform of the pulse that is reflected by the target.

37. The ladar apparatus of claim 36, wherein the matched-filer correlator includes a computer connected to said digitizer means and programmed to store the digitized temporal waveforms of the pulse that is transmitted and of the pulse that is reflected, modify the temporal waveform of the pulse that is transmitted with a sequence of hypothetical phase changes that correspond to a sequence of hypothetical velocities of the target to create a sequence of filters, and perform matched-filter cross-correlation between the waveform of the pulse that is reflected and the filters to find a filter that matches the waveform of the pulse that is reflected.

38. The ladar apparatus of claim 37, wherein the computer is also programmed to perform Fourier transforms of the filters and of the temporal waveform of the pulse that is reflected by the target and performing the matched-filter cross-correlation with such Fourier transforms of the waveform of the pulse that is reflected and of the filters.

39. A method of Doppler range and velocity imaging of a target in relation to a platform, comprising the steps of::
transmitting from the platform a pulse of light having a definite duration and a temporal waveform comprising multiple, simultaneous frequency components with varying phase relationships between the frequency components and incommensurate spectral frequency spacing;
recording the temporal waveform in the duration of the pulse while transmitting the pulse;
detecting at the platform and recording a reflection of the pulse waveform from the target;
modifying the recorded transmitted waveform with a sequence of phase shifts that correspond to a sequence of hypothesized target velocities in relation to the platform to obtain a sequence of modified waveforms and performing a sequence of matched-filter cross-correlations between the modified waveforms and the reflection pulse waveform until a match is found between the reflection pulse waveform and a modified waveform.

40. The method of claim 39, including the step of determining actual velocity of the target in relation to the platform as being equal to the hypothesized velocity that corresponds to the modified waveform that matches the reflection pulse waveform.

41. The method of claim 39, including the steps of measuring time elapsed between transmitting the pulse of light from the platform and detecting the reflection pulse waveform from the target that matches an adjusted waveform, and determining range of the target by multiplying speed of light times one-half of the time elapsed.

42. The method of claim 39, including the steps of obtaining a Fourier transform of the temporal waveform of the reflection detected at the platform, obtaining a Fourier transform of the temporal waveform transmitted from the platform, modifying the Fourier transform of the temporal waveform transmitted from the platform with a sequence of phase shift parameters that correspond to a sequence of hypothesized velocities of the target in relation to the platform to obtain a sequence of modified Fourier transforms of the transmitted waveform, and performing a sequence of matched-filter cross-correlations between the modified Fourier transforms of the transmitted waveform and the Fourier transform of the Fourier transform of the reflected waveform until a match is found between the Fourier transform of the reflected waveform and a modified Fourier transform of the transmitted waveform.

43. The method of claim 42, including the steps of generating the pulse of light by converting a continuous wave beam of single frequency light energy to a pulse of broadband light comprising multiple, simultaneous frequency content.

44. The method of claim 43, including the steps of converting the continuous wave beam of single frequency light into continuous wave broadband light having multiple, simultaneous frequency content, gating the continuous wave broadband light into a signal of said definite duration, and amplifying said signal into said pulse of light.

45. The method of claim 44, including the step of randomizing phases of the frequency components.

46. The method of claim 43, including the steps of detecting the temporal waveform of the transmitted pulse of light by mixing a portion of the transmittal pulse of light with local oscillator continuous wave light having a single frequency, and detecting the waveform of the reflected pulse by mixing the reflected pulse of light with the same local oscillator continuous wave light.

47. The method of claim 46, including the step of obtaining the local oscillator light from a light source that is common with the continuous wave beam of single frequency light that is used to generate the pulse of light.

48. The method of claim 44, including the steps of feeding the continuous wave beam of single frequency light into an endless optical loop that propagates the light repetitively through a frequency shifting modulator to create the continuous wave broadband light.

49. The method of claim 48, including the steps of forming said optical loop with an acoustic diffraction grating for the frequency shifting modulator, a doped fiber amplifier for the amplifier, optical fibers connecting the acoustic diffraction grating and the fiber amplifier together in an endless optical ring circuit, and an optical coupler for propagating the continuous wave light into the optical ring circuit.

50. The method of claim 49, including the step of forming said gate with an optical coupler in the optical ring circuit and an acoustic diffraction grating.

51. The method of claim 49, including the step of forming said gate with an optical coupler in the optical ring circuit and an amplitude modulated Mach-Zender device.

52. The method of claim 45, including the steps of generating the signal of light by:
   (a) feeding the single frequency, continuous wave beam of light into an endless optical loop that comprises a frequency shifting modulator, an amplifier, and a gate;
   (b) circulating the continuous wave laser beam in the optical loop for a plurality of cycles through the frequency shifting modulator and amplifier to create light in the optical loop having a plurality of discrete, simultaneous frequencies; and
   (c) opening the gate to switch the light out of the optical loop for the duration of the pulse and then closing the gate.

53. The method of claim 52, including the step of amplifying the signal that is switched out of the optical loop prior to transmission of the pulse of light.

54. The method of claim 49, including the step of amplifying the signal by passing the signal once through a secondary fiber amplifier.

55. The method of claim 52, including the step of amplifying the signal by passing the signal twice sequentially through a secondary fiber amplifier.

56. The method of claim 55, including the step of amplifying the signal by passing the signal once in a first direction through the secondary fiber amplifier and then passing the signal in a second direction opposite to the first direction through the secondary fiber amplifier.

57. The method of claim 56, including the steps of propagating the signal in said first direction into the secondary fiber amplifier through a polarized beam splitter, rotating polarization of the signal by 90 degrees after the signal passes through the amplifier in the first direction, counter-propagating the signal through the secondary fiber amplifier in the second direction, and extracting the pulse from the secondary fiber amplifier with the polarized beam splitter for transmission to the target.

58. The method of claim 57, including the steps of rotating polarization of the signal by 45 degrees after the signal is propagated in said first direction through the secondary fiber amplifier, reflecting the signal for counter-propagation, rotating polarization of the signal by an additional 45 degrees, and counter-propagating the signal through the secondary amplifier in the second direction.

59. The method of claim 58, including the steps of rotating polarization of the beam of light propagated in said first direction by passing the signal in the first direction through a magnetic field and rotating polarization of the beam of light counter-propagated in the second direction by passing the signal in the second direction through the same magnetic field.

60. The method of claim 58, including the steps of selectively reflecting light in the beam that is predetermined spectral bandwidth while passing light in the beam that is outside the predetermined spectral bandwidth away from the fiber amplifier.

61. The method of claim 60, including the step of selectively reflecting light in the beam by propagating the beam into a Bragg fiber grating that reflects light of wavelengths within the predetermined spectral bandwidth and that transmits light of wavelengths outside the predetermined spectral bandwidth.

62. The method of claim 53, including the step of amplifying the signal by passing the signal multiple (greater than two) times in a secondary loop through a secondary fiber amplifier.

63. The method of claim 39, including the steps of generating the pulse of light by passing light energy emission in a Q-switched fiber laser through a narrow band filter, frequency-shifting feedback of filtered light energy into the fiber laser, and Q-switching a pulse of amplified light energy out of the fiber laser.

64. The method of claim 43, comprising the steps of pumping the continuous wave beam of single frequency light into a Q-switched fiber laser in an optical circuit comprising the fiber laser, a Q-switch, a narrow band spectral filter, and a frequency modulator, amplifying light energy emission in the fiber laser while filtering-out light energy of wavelengths that are outside a narrow bandwidth with the narrow band spectral filter, frequency shifting and feeding the filtered light energy back into the fiber laser, and Q-switching the pulse of light out of the fiber amplifier for transmission to the target.

* * * * *